United States Patent
Burman et al.

(10) Patent No.: US 10,809,982 B2
(45) Date of Patent: *Oct. 20, 2020

(54) WORKFLOW SUPPORT FOR DYNAMIC ACTION INPUT

(71) Applicant: ServiceNow, Inc., Santa Clara, CA (US)

(72) Inventors: Jacob Samuel Burman, Carlsbad, CA (US); Rebecca Anita Dias, Seattle, WA (US); Joshua Timothy Nerius, Chicago, IL (US); Christopher Maloy, Payson, UT (US); Alberto Alvarado Jimenez, Santee, CA (US); Harry Thomas Nelson, San Diego, CA (US)

(73) Assignee: ServiceNow, Inc., Santa Clara, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/592,216

(22) Filed: Oct. 3, 2019

(65) Prior Publication Data

US 2020/0301677 A1 Sep. 24, 2020

Related U.S. Application Data

(63) Continuation of application No. 16/358,148, filed on Mar. 19, 2019, now Pat. No. 10,452,360.

(51) Int. Cl.
*G06F 8/34* (2018.01)
*G06Q 10/06* (2012.01)
(Continued)

(52) U.S. Cl.
CPC .............. *G06F 8/34* (2013.01); *G06F 3/0482* (2013.01); *G06F 9/44521* (2013.01);
(Continued)

(58) Field of Classification Search
None
See application file for complete search history.

(56) References Cited

U.S. PATENT DOCUMENTS 5,999,911 A 12/1999 Berg
6,609,122 B1 8/2003 Ensor
(Continued)

FOREIGN PATENT DOCUMENTS

EP 004556611-0001 2/2018
EP 004556611-0002 2/2018
(Continued)

OTHER PUBLICATIONS

"ServiceNow London IT Operations Management", ServiceNow Docs, Mar. 12, 2019, 88 pages.
(Continued)

*Primary Examiner* — Qing Chen
(74) *Attorney, Agent, or Firm* — Fletcher Yoder PC

(57) ABSTRACT

Persistent storage may contain a definition of an application programming interface (API) of a remote service, where the API provides access to input information stored at the remote service. One or more processors may be configured to: (i) provide, for display on an action design graphical user interface (GUI), a first menu that allows selection of a first set of the input information to be dynamically retrieved from the API during design of a workflow; (ii) provide, for display on the action design GUI, a second menu that allows selection of a second set of the input information to be dynamically retrieved from the API during design of the workflow; and (iii) provide for display, on the action design GUI, options for specifying the API, how to remotely access the API, and how to parse data received from the API.

20 Claims, 31 Drawing Sheets

(51) Int. Cl.
*G06F 9/445* (2018.01)
*G06F 9/451* (2018.01)
*G06F 3/0482* (2013.01)
*G06F 9/54* (2006.01)

(52) U.S. Cl.
CPC .............. *G06F 9/451* (2018.02); *G06F 9/541* (2013.01); *G06Q 10/0633* (2013.01)

(56) References Cited

U.S. PATENT DOCUMENTS

| | | | |
|---|---|---|---|
| 7,028,301 | B2 | 4/2006 | Ding |
| 7,062,683 | B2 | 6/2006 | Warpenburg |
| 7,131,037 | B1 | 10/2006 | LeFaive |
| 7,170,864 | B2 | 1/2007 | Matharu |
| 7,350,209 | B2 | 3/2008 | Shum |
| 7,610,512 | B2 | 10/2009 | Gerber |
| 7,617,073 | B2 | 11/2009 | Trinon |
| 7,689,628 | B2 | 3/2010 | Garg |
| 7,783,744 | B2 | 8/2010 | Garg |
| 7,890,802 | B2 | 2/2011 | Gerber |
| 7,930,396 | B2 | 4/2011 | Trinon |
| 7,945,860 | B2 | 5/2011 | Vambenepe |
| 7,966,398 | B2 | 6/2011 | Wiles |
| 8,051,162 | B2 | 11/2011 | Peuter |
| 8,224,683 | B2 | 7/2012 | Manos |
| 8,266,096 | B2 | 9/2012 | Navarrete |
| 8,457,928 | B2 | 6/2013 | Dang |
| 8,478,569 | B2 | 7/2013 | Scarpelli |
| 8,674,992 | B2 | 3/2014 | Poston |
| 8,689,241 | B2 | 4/2014 | Naik |
| 8,743,121 | B2 | 6/2014 | De Peuter |
| 8,887,133 | B2 | 11/2014 | Behnia |
| 9,239,857 | B2 | 1/2016 | Trinon |
| 9,535,737 | B2 | 1/2017 | Joy |
| 9,792,387 | B2 | 10/2017 | George |
| 10,101,972 | B1 | 10/2018 | Nelson |
| 2003/0004770 | A1 | 1/2003 | Miller et al. |
| 2004/0148213 | A1 | 7/2004 | Aziz et al. |
| 2004/0148214 | A1 | 7/2004 | Aziz et al. |
| 2004/0148299 | A1 | 7/2004 | Teegan et al. |
| 2005/0066304 | A1 | 3/2005 | Tattrie et al. |
| 2014/0236663 | A1 | 8/2014 | Smith et al. |
| 2015/0370540 | A1 | 12/2015 | Coslovi et al. |
| 2017/0147290 | A1 | 5/2017 | Kumar et al. |
| 2017/0315789 | A1 | 11/2017 | Lam et al. |
| 2017/0329506 | A1 | 11/2017 | Laetham et al. |
| 2018/0107461 | A1 | 4/2018 | Balasubramanian et al. |
| 2018/0321654 | A1 | 11/2018 | Tucker |
| 2018/0321833 | A1 | 11/2018 | Nelson |
| 2018/0324051 | A1 | 11/2018 | Dias |

FOREIGN PATENT DOCUMENTS

| | | |
|---|---|---|
| EP | 004556611-0003 | 2/2018 |
| EP | 004556611-0004 | 2/2018 |
| EP | 004556611-0005 | 2/2018 |
| EP | 004556611-0006 | 2/2018 |
| EP | 004556611-0007 | 2/2018 |
| EP | 004556611-0008 | 2/2018 |
| EP | 3454203 A1 | 3/2019 |

OTHER PUBLICATIONS

"ServiceNow London Platform Capabilities", ServiceNow Docs, Mar. 12, 2019, 354 pages.
International Search Report and Written Opinion for PCT Application No. PCT/US2020/023690; 13 pgs.

| Offboarding | Status: Draft | App: User Management | Edit | Test | Copy | Save | Activate |
|---|---|---|---|---|---|---|---|

| Action | | State | Start time | Duration |
|---|---|---|---|---|
| | 1. Look up records in [sc_request] when requested for is Trigger->[sys_user] Record | Complete | 09:08:15 | 120ms |
| | 2. For each item in 1->[sc_request] Records | Complete | 09:08:15 | 2195ms |
| | 2.1. Update 2->[sc_request] Record (Request state->Closed cancelled, Comments->"User no longer with company") | Complete | 09:08:16 | 796ms |
| Action | 3. Look up records in [task] when assigned to is Trigger->[sys_user] Record | Complete | 09:08:17 | 43ms |
| | 4. For each item in 3->[task] Records | Complete | 09:08:17 | 338ms |
| | 4.1. Update 4->[task] Record (Assigned to->Trigger->[sys_user]->Manager) | Complete | 09:08:17 | 70ms |

Action Design Phase 900
- Specify dynamic inputs
- Specify remote service API
- Specify parsing and storage of data received from API call(s)
- Store designed action Workflow Design Phase 902
- Specify trigger
- Specify flow with designed action (options for inputs are dynamically retrieved from remote service API)
- Specify any other flows, subflows and actions
- Store designed flow Workflow Execution Phase 904
- Determine that trigger has fired
- Execute designed action with input as specified in the workflow design phase
- Execute any other flows, subflows and actions

FIG. 9

WORKFLOW SUPPORT FOR DYNAMIC ACTION INPUT

CROSS-REFERENCE TO RELATED APPLICATION

This application is a continuation of and claims priority to U.S. patent application Ser. No. 16/358,148 (now U.S. Pat. No. 10,452,360), filed Mar. 19, 2019, which is hereby incorporated by reference in its entirety.

BACKGROUND

A workflow is a specific sequence or series of tasks that, when performed, seek to accomplish one or more goals. In some cases, workflows may be represented or thought of as a state machine having two or more states connected by various transitions therebetween. Transitions from state to state may be triggered by or based on user input, automated input, information being stored in a database, the value of information in a database changing, or by way of other mechanisms. Workflows may be supported by way of a remote network management platform that provides a web-based interface for workflow definition, execution, and management.

Enterprise workflows may integrate information from various sources, including from remote services hosted on third-party servers outside of the remote network management platform and the enterprise. For example, a workflow applying a particular information technology (IT) policy to an enterprise user's computing device or account may consider the capabilities of the computing device as well as the user's profile and access permissions. The former information may be stored locally within the remote network management platform, and is thus readily available and under control of the enterprise. On the other hand, the latter information may be outsourced to a remote service.

In order to obtain the user's profile and access permissions, the remote network management platform may be configured with appropriate credentials to access the remote service, as well as a schema thereof that defines tables, fields, forms, application programming interfaces, and so on that contain the sought-after information. Nonetheless, the remote service or the enterprise may, from time to time, change this schema. If the remote network management platform does not adapt its access requests accordingly, its workflows will either fail or be unable to access all of the information available by way of the remote service.

SUMMARY

The embodiments herein provide graphical user interfaces (GUIs) and other mechanisms to integrate with a remote service that stores sought-after information in a schema that is unknown and/or that may change from time to time. These GUIs allow an action of a workflow to be defined with dynamic input, so that the workflow can adapt to these changes. Advantageously, this allows workflows to be defined in a flexible, no-code fashion. In particular, actions incorporated into a workflow during workflow design are not hard-coded to a specific version of the schema. Therefore, these actions can provide the workflow designer with options to fully utilize the schema as it exists during workflow design, e.g., by introspecting the remote service's current schema.

In particular, the embodiments herein may relate to three distinct phases: action design, workflow design, and workflow execution. During the action design phase, an action can be defined with dynamic input. This input may be from a remote service that is accessible by way of an application programming interface (API). The action may be further defined with a specification of the API, how it is called, how to parse the data it returns, and where to store the parsed data. A definition of the action may be stored to memory.

During the workflow design phase, a stored action with dynamic input may be incorporated into a workflow. Doing so may cause, during the workflow design phase, dynamic retrieval of information regarding the capabilities of the API. Examples of this include a list of tables accessible by way of the API, and a list of fields in a particular one of the tables. Operations on one or more of these tables and/or fields may be added to the workflow. The workflow may be further defined with additional flows, subflows, and actions. A definition of the workflow may be stored to memory.

During the workflow execution phase, a trigger event may cause the workflow to begin execution. When the action is performed, it may carry out the operations on the tables and/or fields as defined in the workflow.

In this fashion, a user can incorporate actions that manipulate specific data accessible by way of the API without having to write program code to support this accessing and manipulating. Instead, actions with dynamic input and workflows incorporating these actions can be defined in a no-code fashion and by way of a GUI. This dramatically decreases the amount of time needed to provide workflow support for an API with a schema that has changed or may change.

Accordingly, a first example embodiment may involve a computational instance of a remote network management platform comprising persistent storage and one or more processors. The persistent storage may contain a definition of an API of a remote service, where the API provides access to input information stored at the remote service, and where the remote service is physically distinct from the computational instance. The one or more processors may be configured to perform operations that obtain, by way of an action design GUI, a definition of an action that receives dynamic input from the API, where the action is configured for integration into a workflow. The operations may comprise: (i) providing, for display on a first version of the action design GUI, a first menu that allows selection of a first set of the input information to be dynamically retrieved from the API during design of the workflow; (ii) possibly in response to receiving the selection of the first set of the input information, providing, for display on a second version of the action design GUI, a second menu that allows selection of a second set of the input information to be dynamically retrieved from the API during design of the workflow, where the second set of the input information is related to the selection of the first set of the input information; (iii) possibly in response to receiving the selection of the second set of the input information, providing for display, on one or more further versions of the action design GUI, options for specifying the API, how to remotely access the API, and how to parse data received from the API; and (iv) writing, to the persistent storage, the definition of the action that includes the first set of the input information and the second set of the input information as inputs.

A second example embodiment may involve providing, by a server device and to a client device, for display on a first version of an action design GUI that defines an action configured for integration into a workflow, a first menu that allows selection of a first set of input information to be dynamically retrieved from an API of a remote service, where the dynamic retrieval occurs during design of the workflow, and where the remote service is physically distinct from the server device and the client device. The second example embodiment may further involve, possibly in response to receiving the selection of the first set of the input information, providing, by the server device and to the client device, for display on a second version of the action design GUI, a second menu that allows selection of a second set of the input information to be dynamically retrieved from the API during design of the workflow, where the second set of the input information is related to the selection of the first set of the input information. The second example embodiment may further involve, possibly in response to receiving the selection of the second set of the input information, providing, by the server device and to the client device, for display on one or more further versions of the action design GUI, options for specifying the API, how to remotely access the API, and how to parse data received from the API. The second example embodiment may further involve writing, by the server device and to persistent storage, a definition of the action that includes the first set of the input information and the second set of the input information as inputs.

In a third example embodiment, an article of manufacture may include a non-transitory computer-readable medium, having stored thereon program instructions that, upon execution by a computing system, cause the computing system to perform operations in accordance with the first and/or second example embodiment.

In a fourth example embodiment, a computing system may include at least one processor, as well as memory and program instructions. The program instructions may be stored in the memory, and upon execution by the at least one processor, cause the computing system to perform operations in accordance with the first and/or second example embodiment.

In a fifth example embodiment, a system may include various means for carrying out each of the operations of the first and/or second example embodiment.

These, as well as other embodiments, aspects, advantages, and alternatives, will become apparent to those of ordinary skill in the art by reading the following detailed description, with reference where appropriate to the accompanying drawings. Further, this summary and other descriptions and figures provided herein are intended to illustrate embodiments by way of example only and, as such, that numerous variations are possible. For instance, structural elements and process steps can be rearranged, combined, distributed, eliminated, or otherwise changed, while remaining within the scope of the embodiments as claimed.

BRIEF DESCRIPTION OF THE DRAWINGS

FIGS. 6A, 6B, 6C, 6D, 6E, 6F, 6G, 6H, 6I, 6J, and 6K depict workflow design tool graphical user interfaces, in accordance with example embodiments.

FIG. 9 depicts phases of action design, workflow design, and workflow execution, in accordance with example embodiments.

DETAILED DESCRIPTION

Figure 1:
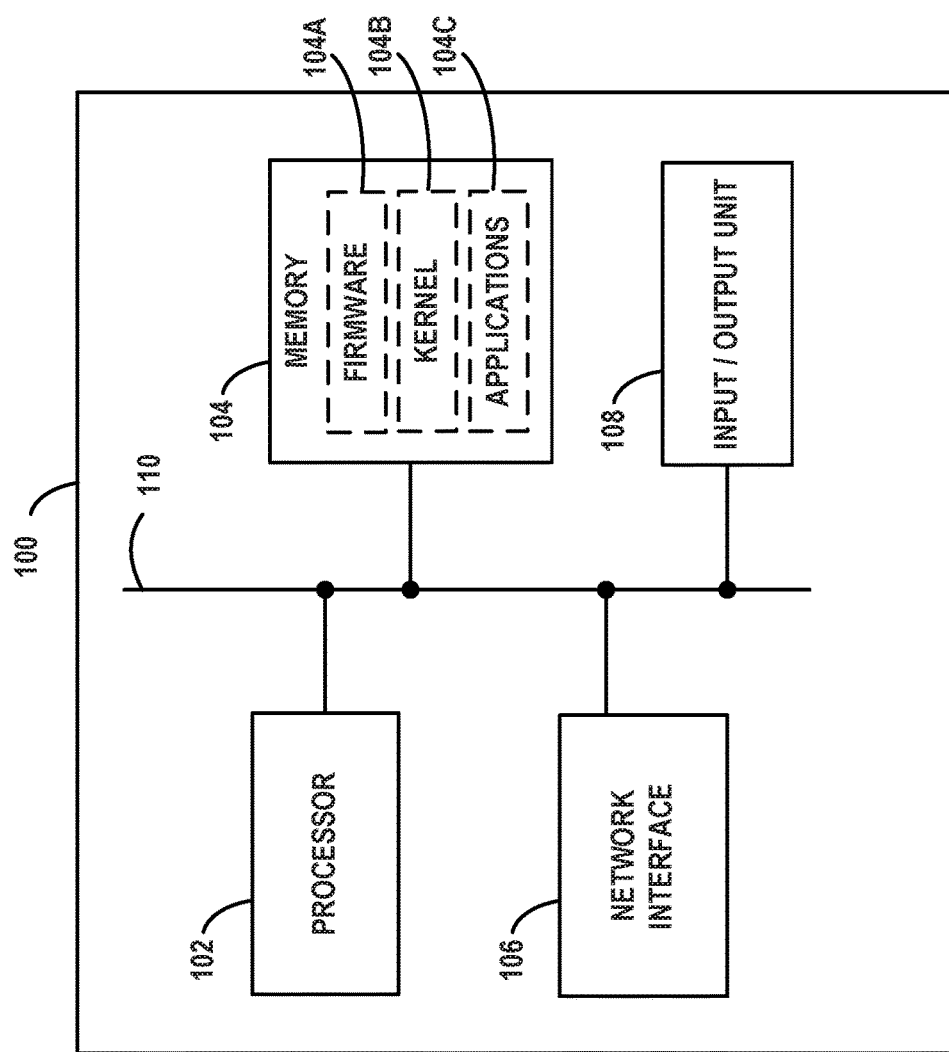
FIG. 1 illustrates a schematic drawing of a computing device, in accordance with example embodiments.

Example methods, devices, and systems are described herein. It should be understood that the words "example" and "exemplary" are used herein to mean "serving as an example, instance, or illustration." Any embodiment or feature described herein as being an "example" or "exemplary" is not necessarily to be construed as preferred or advantageous over other embodiments or features unless stated as such. Thus, other embodiments can be utilized and other changes can be made without departing from the scope of the subject matter presented herein.

Accordingly, the example embodiments described herein are not meant to be limiting. It will be readily understood that the aspects of the present disclosure, as generally described herein, and illustrated in the figures, can be arranged, substituted, combined, separated, and designed in a wide variety of different configurations. For example, the separation of features into "client" and "server" components may occur in a number of ways.

Further, unless context suggests otherwise, the features illustrated in each of the figures may be used in combination with one another. Thus, the figures should be generally viewed as component aspects of one or more overall embodiments, with the understanding that not all illustrated features are necessary for each embodiment.

Additionally, any enumeration of elements, blocks, or steps in this specification or the claims is for purposes of clarity. Thus, such enumeration should not be interpreted to require or imply that these elements, blocks, or steps adhere to a particular arrangement or are carried out in a particular order.

I. Introduction

A large enterprise is a complex entity with many interrelated operations. Some of these are found across the enterprise, such as human resources (HR), supply chain, information technology (IT), and finance. However, each enterprise also has its own unique operations that provide essential capabilities and/or create competitive advantages.

To support widely-implemented operations, enterprises typically use off-the-shelf software applications, such as customer relationship management (CRM) and human capital management (HCM) packages. However, they may also need custom software applications to meet their own unique requirements. A large enterprise often has dozens or hundreds of these custom software applications. Nonetheless, the advantages provided by the embodiments herein are not limited to large enterprises and may be applicable to an enterprise, or any other type of organization, of any size.

Many such software applications are developed by individual departments within the enterprise. These range from simple spreadsheets to custom-built software tools and databases. But the proliferation of siloed custom software applications has numerous disadvantages. It negatively impacts an enterprise's ability to run and grow its operations, innovate, and meet regulatory requirements. The enterprise may find it difficult to integrate, streamline and enhance its operations due to lack of a single system that unifies its subsystems and data.

To efficiently create custom applications, enterprises would benefit from a remotely-hosted application platform that eliminates unnecessary development complexity. The goal of such a platform would be to reduce time-consuming, repetitive application development tasks so that software engineers and individuals in other roles can focus on developing unique, high-value features.

In order to achieve this goal, the concept of Application Platform as a Service (aPaaS) is introduced, to intelligently automate workflows throughout the enterprise. An aPaaS system is hosted remotely from the enterprise, but may access data, applications, and services within the enterprise by way of secure connections. Such an aPaaS system may have a number of advantageous capabilities and characteristics. These advantages and characteristics may be able to improve the enterprise's operations and workflow for IT, HR, CRM, customer service, application development, and security.

The aPaaS system may support development and execution of model-view-controller (MVC) applications. MVC applications divide their functionality into three interconnected parts (model, view, and controller) in order to isolate representations of information from the manner in which the information is presented to the user, thereby allowing for efficient code reuse and parallel development. These applications may be web-based, and offer create, read, update, delete (CRUD) capabilities. This allows new applications to be built on a common application infrastructure.

The aPaaS system may support standardized application components, such as a standardized set of widgets for graphical user interface (GUI) development. In this way, applications built using the aPaaS system have a common look and feel. Other software components and modules may be standardized as well. In some cases, this look and feel can be branded or skinned with an enterprise's custom logos and/or color schemes.

The aPaaS system may support the ability to configure the behavior of applications using metadata. This allows application behaviors to be rapidly adapted to meet specific needs. Such an approach reduces development time and increases flexibility. Further, the aPaaS system may support GUI tools that facilitate metadata creation and management, thus reducing errors in the metadata.

The aPaaS system may support clearly-defined interfaces between applications, so that software developers can avoid unwanted inter-application dependencies. Thus, the aPaaS system may implement a service layer in which persistent state information and other data are stored.

The aPaaS system may support a rich set of integration features so that the applications thereon can interact with legacy applications and third-party applications. For instance, the aPaaS system may support a custom employee-onboarding system that integrates with legacy HR, IT, and accounting systems.

The aPaaS system may support enterprise-grade security. Furthermore, since the aPaaS system may be remotely hosted, it should also utilize security procedures when it interacts with systems in the enterprise or third-party networks and services hosted outside of the enterprise. For example, the aPaaS system may be configured to share data amongst the enterprise and other parties to detect and identify common security threats.

Other features, functionality, and advantages of an aPaaS system may exist. This description is for purpose of example and is not intended to be limiting.

As an example of the aPaaS development process, a software developer may be tasked to create a new application using the aPaaS system. First, the developer may define the data model, which specifies the types of data that the application uses and the relationships therebetween. Then, via a GUI of the aPaaS system, the developer enters (e.g., uploads) the data model. The aPaaS system automatically creates all of the corresponding database tables, fields, and relationships, which can then be accessed via an object-oriented services layer.

In addition, the aPaaS system can also build a fully-functional MVC application with client-side interfaces and server-side CRUD logic. This generated application may serve as the basis of further development for the user. Advantageously, the developer does not have to spend a large amount of time on basic application functionality. Further, since the application may be web-based, it can be accessed from any Internet-enabled client device. Alternatively or additionally, a local copy of the application may be able to be accessed, for instance, when Internet service is not available.

The aPaaS system may also support a rich set of pre-defined functionality that can be added to applications. These features include support for searching, email, templating, workflow design, reporting, analytics, social media, scripting, mobile-friendly output, and customized GUIs.

The following embodiments describe architectural and functional aspects of example aPaaS systems, as well as the features and advantages thereof.

II. Example Computing Devices and Cloud-Based Computing Environments

FIG. 1 is a simplified block diagram exemplifying a computing device 100, illustrating some of the components that could be included in a computing device arranged to operate in accordance with the embodiments herein. Computing device 100 could be a client device (e.g., a device actively operated by a user), a server device (e.g., a device that provides computational services to client devices), or some other type of computational platform. Some server devices may operate as client devices from time to time in order to perform particular operations, and some client devices may incorporate server features.

In this example, computing device 100 includes processor 102, memory 104, network interface 106, and an input/output unit 108, all of which may be coupled by a system bus 110 or a similar mechanism. In some embodiments, computing device 100 may include other components and/or peripheral devices (e.g., detachable storage, printers, and so on).

Processor 102 may be one or more of any type of computer processing element, such as a central processing unit (CPU), a co-processor (e.g., a mathematics, graphics, or encryption co-processor), a digital signal processor (DSP), a network processor, and/or a form of integrated circuit or controller that performs processor operations. In some cases, processor 102 may be one or more single-core processors. In other cases, processor 102 may be one or more multi-core processors with multiple independent processing units. Processor 102 may also include register memory for temporarily storing instructions being executed and related data, as well as cache memory for temporarily storing recently-used instructions and data.

Memory 104 may be any form of computer-usable memory, including but not limited to random access memory (RAM), read-only memory (ROM), and non-volatile memory (e.g., flash memory, hard disk drives, solid state drives, compact discs (CDs), digital video discs (DVDs), and/or tape storage). Thus, memory 104 represents both main memory units, as well as long-term storage. Other types of memory may include biological memory.

Memory 104 may store program instructions and/or data on which program instructions may operate. By way of example, memory 104 may store these program instructions on a non-transitory, computer-readable medium, such that the instructions are executable by processor 102 to carry out any of the methods, processes, or operations disclosed in this specification or the accompanying drawings.

As shown in FIG. 1, memory 104 may include firmware 104A, kernel 104B, and/or applications 104C. Firmware 104A may be program code used to boot or otherwise initiate some or all of computing device 100. Kernel 104B may be an operating system, including modules for memory management, scheduling and management of processes, input/output, and communication. Kernel 104B may also include device drivers that allow the operating system to communicate with the hardware modules (e.g., memory units, networking interfaces, ports, and busses), of computing device 100. Applications 104C may be one or more user-space software programs, such as web browsers or email clients, as well as any software libraries used by these programs. Memory 104 may also store data used by these and other programs and applications.

Network interface 106 may take the form of one or more wireline interfaces, such as Ethernet (e.g., Fast Ethernet, Gigabit Ethernet, and so on). Network interface 106 may also support communication over one or more non-Ethernet media, such as coaxial cables or power lines, or over wide-area media, such as Synchronous Optical Networking (SONET) or digital subscriber line (DSL) technologies. Network interface 106 may additionally take the form of one or more wireless interfaces, such as IEEE 802.11 (Wifi), BLUETOOTH®, global positioning system (GPS), or a wide-area wireless interface. However, other forms of physical layer interfaces and other types of standard or proprietary communication protocols may be used over network interface 106. Furthermore, network interface 106 may comprise multiple physical interfaces. For instance, some embodiments of computing device 100 may include Ethernet, BLUETOOTH®, and Wifi interfaces.

Input/output unit 108 may facilitate user and peripheral device interaction with computing device 100. Input/output unit 108 may include one or more types of input devices, such as a keyboard, a mouse, a touch screen, and so on. Similarly, input/output unit 108 may include one or more types of output devices, such as a screen, monitor, printer, and/or one or more light emitting diodes (LEDs). Additionally or alternatively, computing device 100 may communicate with other devices using a universal serial bus (USB) or high-definition multimedia interface (HDMI) port interface, for example.

In some embodiments, one or more computing devices like computing device 100 may be deployed to support an aPaaS architecture. The exact physical location, connectivity, and configuration of these computing devices may be unknown and/or unimportant to client devices. Accordingly, the computing devices may be referred to as "cloud-based" devices that may be housed at various remote data center locations.

Figure 2:
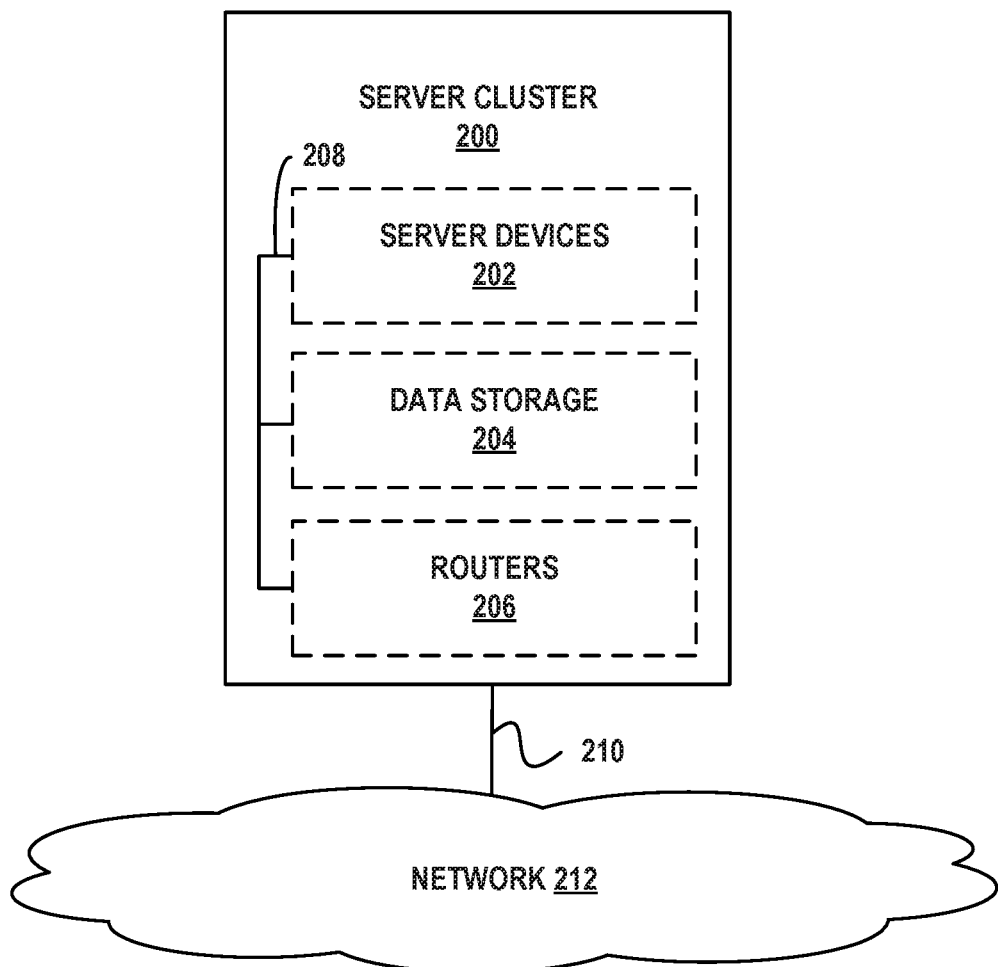
FIG. 2 illustrates a schematic drawing of a server device cluster, in accordance with example embodiments.

FIG. 2 depicts a cloud-based server cluster 200 in accordance with example embodiments. In FIG. 2, operations of a computing device (e.g., computing device 100) may be distributed between server devices 202, data storage 204, and routers 206, all of which may be connected by local cluster network 208. The number of server devices 202, data storages 204, and routers 206 in server cluster 200 may depend on the computing task(s) and/or applications assigned to server cluster 200.

For example, server devices 202 can be configured to perform various computing tasks of computing device 100. Thus, computing tasks can be distributed among one or more of server devices 202. To the extent that these computing tasks can be performed in parallel, such a distribution of tasks may reduce the total time to complete these tasks and return a result. For purpose of simplicity, both server cluster 200 and individual server devices 202 may be referred to as a "server device." This nomenclature should be understood to imply that one or more distinct server devices, data storage devices, and cluster routers may be involved in server device operations.

Data storage 204 may be data storage arrays that include drive array controllers configured to manage read and write access to groups of hard disk drives and/or solid state drives. The drive array controllers, alone or in conjunction with server devices 202, may also be configured to manage backup or redundant copies of the data stored in data storage 204 to protect against drive failures or other types of failures that prevent one or more of server devices 202 from accessing units of data storage 204. Other types of memory aside from drives may be used.

Routers 206 may include networking equipment configured to provide internal and external communications for server cluster 200. For example, routers 206 may include one or more packet-switching and/or routing devices (including switches and/or gateways) configured to provide (i) network communications between server devices 202 and data storage 204 via local cluster network 208, and/or (ii) network communications between the server cluster 200 and other devices via communication link 210 to network 212.

Additionally, the configuration of routers 206 can be based at least in part on the data communication requirements of server devices 202 and data storage 204, the latency and throughput of the local cluster network 208, the latency, throughput, and cost of communication link 210, and/or other factors that may contribute to the cost, speed, fault-tolerance, resiliency, efficiency and/or other design goals of the system architecture.

As a possible example, data storage 204 may include any form of database, such as a structured query language (SQL) database. Various types of data structures may store the information in such a database, including but not limited to tables, arrays, lists, trees, and tuples. Furthermore, any databases in data storage 204 may be monolithic or distributed across multiple physical devices.

Server devices 202 may be configured to transmit data to and receive data from data storage 204. This transmission and retrieval may take the form of SQL queries or other types of database queries, and the output of such queries, respectively. Additional text, images, video, and/or audio may be included as well. Furthermore, server devices 202 may organize the received data into web page representations. Such a representation may take the form of a markup language, such as the hypertext markup language (HTML), the extensible markup language (XML), or some other standardized or proprietary format. Moreover, server devices 202 may have the capability of executing various types of computerized scripting languages, such as but not limited to Perl, Python, PHP Hypertext Preprocessor (PHP), Active Server Pages (ASP), JAVASCRIPT®, and so on. Computer program code written in these languages may facilitate the providing of web pages to client devices, as well as client device interaction with the web pages.

III. Example Remote Network Management Architecture

Figure 3:
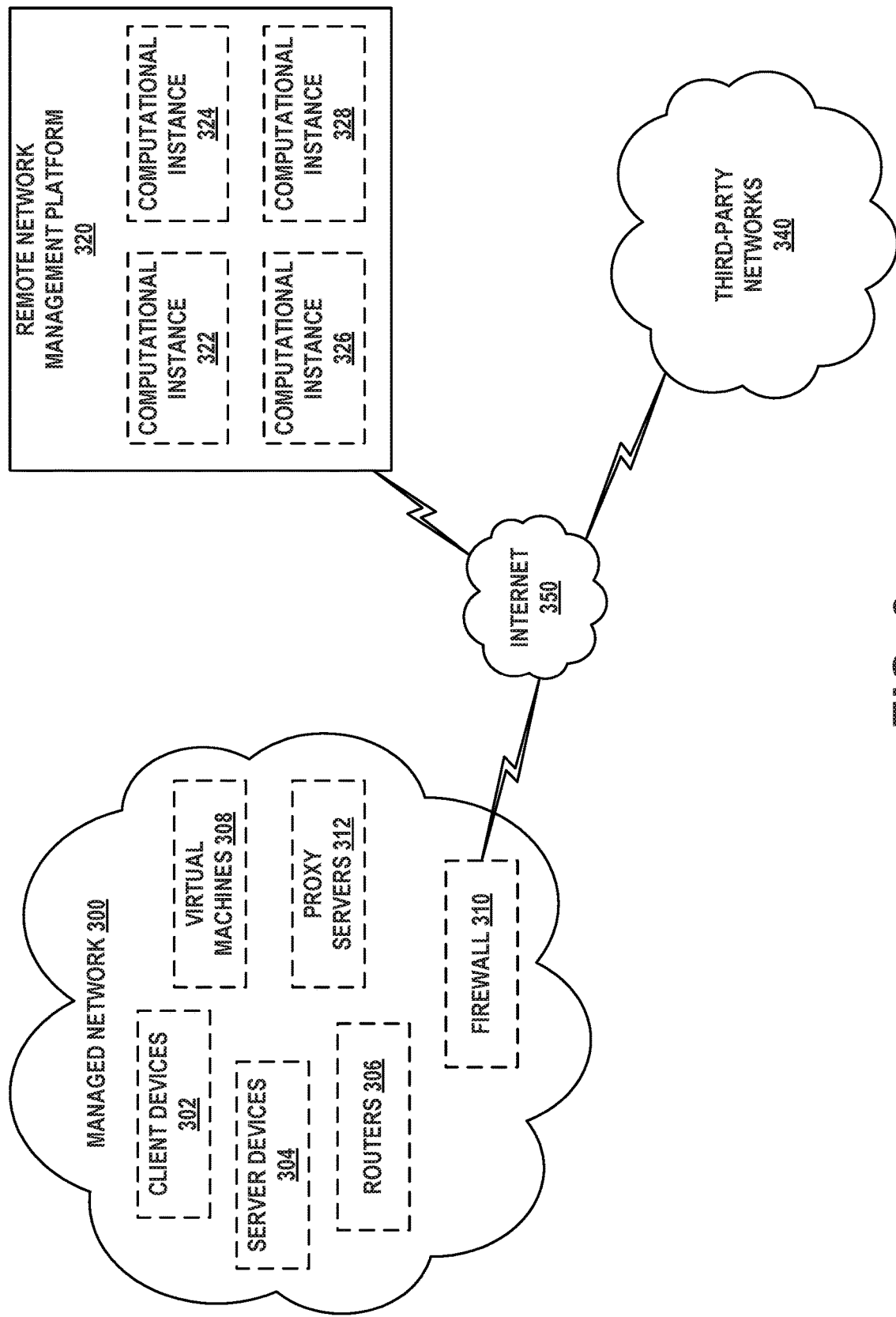
FIG. 3 depicts a remote network management architecture, in accordance with example embodiments.

FIG. 3 depicts a remote network management architecture, in accordance with example embodiments. This architecture includes three main components, managed network 300, remote network management platform 320, and third-party networks 340, all connected by way of Internet 350.

Managed network 300 may be, for example, an enterprise network used by an entity for computing and communications tasks, as well as storage of data. Thus, managed network 300 may include client devices 302, server devices 304, routers 306, virtual machines 308, firewall 310, and/or proxy servers 312. Client devices 302 may be embodied by computing device 100, server devices 304 may be embodied by computing device 100 or server cluster 200, and routers 306 may be any type of router, switch, or gateway.

Virtual machines 308 may be embodied by one or more of computing device 100 or server cluster 200. In general, a virtual machine is an emulation of a computing system, and mimics the functionality (e.g., processor, memory, and communication resources) of a physical computer. One physical computing system, such as server cluster 200, may support up to thousands of individual virtual machines. In some embodiments, virtual machines 308 may be managed by a centralized server device or application that facilitates allocation of physical computing resources to individual virtual machines, as well as performance and error reporting. Enterprises often employ virtual machines in order to allocate computing resources in an efficient, as needed fashion. Providers of virtualized computing systems include VMWARE® and MICROSOFT®.

Firewall 310 may be one or more specialized routers or server devices that protect managed network 300 from unauthorized attempts to access the devices, applications, and services therein, while allowing authorized communication that is initiated from managed network 300. Firewall 310 may also provide intrusion detection, web filtering, virus scanning, application-layer gateways, and other applications or services. In some embodiments not shown in FIG. 3, managed network 300 may include one or more virtual private network (VPN) gateways with which it communicates with remote network management platform 320 (see below).

Managed network 300 may also include one or more proxy servers 312. An embodiment of proxy servers 312 may be a server device that facilitates communication and movement of data between managed network 300, remote network management platform 320, and third-party networks 340. In particular, proxy servers 312 may be able to establish and maintain secure communication sessions with one or more computational instances of remote network management platform 320. By way of such a session, remote network management platform 320 may be able to discover and manage aspects of the architecture and configuration of managed network 300 and its components. Possibly with the assistance of proxy servers 312, remote network management platform 320 may also be able to discover and manage aspects of third-party networks 340 that are used by managed network 300.

Firewalls, such as firewall 310, typically deny all communication sessions that are incoming by way of Internet 350, unless such a session was ultimately initiated from behind the firewall (i.e., from a device on managed network 300) or the firewall has been explicitly configured to support the session. By placing proxy servers 312 behind firewall 310 (e.g., within managed network 300 and protected by firewall 310), proxy servers 312 may be able to initiate these communication sessions through firewall 310. Thus, firewall 310 might not have to be specifically configured to support incoming sessions from remote network management platform 320, thereby avoiding potential security risks to managed network 300.

In some cases, managed network 300 may consist of a few devices and a small number of networks. In other deployments, managed network 300 may span multiple physical locations and include hundreds of networks and hundreds of thousands of devices. Thus, the architecture depicted in FIG. 3 is capable of scaling up or down by orders of magnitude.

Furthermore, depending on the size, architecture, and connectivity of managed network 300, a varying number of proxy servers 312 may be deployed therein. For example, each one of proxy servers 312 may be responsible for communicating with remote network management platform 320 regarding a portion of managed network 300. Alternatively or additionally, sets of two or more proxy servers may be assigned to such a portion of managed network 300 for purposes of load balancing, redundancy, and/or high availability.

Remote network management platform 320 is a hosted environment that provides aPaaS services to users, particularly to the operators of managed network 300. These services may take the form of web-based portals, for instance. Thus, a user can securely access remote network management platform 320 from, for instance, client devices 302, or potentially from a client device outside of managed network 300. By way of the web-based portals, users may design, test, and deploy applications, generate reports, view analytics, and perform other tasks.

As shown in FIG. 3, remote network management platform 320 includes four computational instances 322, 324, 326, and 328. Each of these instances may represent one or more server devices and/or one or more databases that provide a set of web portals, services, and applications (e.g., a wholly-functioning aPaaS system) available to a particular customer. In some cases, a single customer may use multiple computational instances. For example, managed network 300 may be an enterprise customer of remote network management platform 320, and may use computational instances 322, 324, and 326. The reason for providing multiple instances to one customer is that the customer may wish to independently develop, test, and deploy its applications and services. Thus, computational instance 322 may be dedicated to application development related to managed network 300, computational instance 324 may be dedicated to testing these applications, and computational instance 326 may be dedicated to the live operation of tested applications and services. A computational instance may also be referred to as a hosted instance, a remote instance, a customer instance, or by some other designation. Any application deployed onto a computational instance may be a scoped application, in that its access to databases within the computational instance can be restricted to certain elements therein (e.g., one or more particular database tables or particular rows with one or more database tables).

For purpose of clarity, the disclosure herein refers to the physical hardware, software, and arrangement thereof as a "computational instance." Note that users may colloquially refer to the graphical user interfaces provided thereby as "instances." But unless it is defined otherwise herein, a "computational instance" is a computing system disposed within remote network management platform 320.

The multi-instance architecture of remote network management platform 320 is in contrast to conventional multi-tenant architectures, over which multi-instance architectures exhibit several advantages. In multi-tenant architectures, data from different customers (e.g., enterprises) are comingled in a single database. While these customers' data are separate from one another, the separation is enforced by the software that operates the single database. As a consequence, a security breach in this system may impact all customers' data, creating additional risk, especially for entities subject to governmental, healthcare, and/or financial regulation. Furthermore, any database operations that impact one customer will likely impact all customers sharing that database. Thus, if there is an outage due to hardware or software errors, this outage affects all such customers. Likewise, if the database is to be upgraded to meet the needs of one customer, it will be unavailable to all customers during the upgrade process. Often, such maintenance windows will be long, due to the size of the shared database.

In contrast, the multi-instance architecture provides each customer with its own database in a dedicated computing instance. This prevents comingling of customer data, and allows each instance to be independently managed. For example, when one customer's instance experiences an outage due to errors or an upgrade, other computational instances are not impacted. Maintenance down time is limited because the database only contains one customer's data. Further, the simpler design of the multi-instance architecture allows redundant copies of each customer database and instance to be deployed in a geographically diverse fashion. This facilitates high availability, where the live version of the customer's instance can be moved when faults are detected or maintenance is being performed.

In some embodiments, remote network management platform 320 may include one or more central instances, controlled by the entity that operates this platform. Like a computational instance, a central instance may include some number of physical or virtual servers and database devices. Such a central instance may serve as a repository for data that can be shared amongst at least some of the computational instances. For instance, definitions of common security threats that could occur on the computational instances, software packages that are commonly discovered on the computational instances, and/or an application store for applications that can be deployed to the computational instances may reside in a central instance. Computational instances may communicate with central instances by way of well-defined interfaces in order to obtain this data.

In order to support multiple computational instances in an efficient fashion, remote network management platform 320 may implement a plurality of these instances on a single hardware platform. For example, when the aPaaS system is implemented on a server cluster such as server cluster 200, it may operate a virtual machine that dedicates varying amounts of computational, storage, and communication resources to instances. But full virtualization of server cluster 200 might not be necessary, and other mechanisms may be used to separate instances. In some examples, each instance may have a dedicated account and one or more dedicated databases on server cluster 200. Alternatively, computational instance 322 may span multiple physical devices.

In some cases, a single server cluster of remote network management platform 320 may support multiple independent enterprises. Furthermore, as described below, remote network management platform 320 may include multiple server clusters deployed in geographically diverse data centers in order to facilitate load balancing, redundancy, and/or high availability.

Third-party networks 340 may be remote server devices (e.g., a plurality of server clusters such as server cluster 200) that can be used for outsourced computational, data storage, communication, and service hosting operations. These servers may be virtualized (i.e., the servers may be virtual machines). Examples of third-party networks 340 may include AMAZON WEB SERVICES® and MICROSOFT® AZURE®. Like remote network management platform 320, multiple server clusters supporting third-party networks 340 may be deployed at geographically diverse locations for purposes of load balancing, redundancy, and/or high availability.

Managed network 300 may use one or more of third-party networks 340 to deploy applications and services to its clients and customers. For instance, if managed network 300 provides online music streaming services, third-party networks 340 may store the music files and provide web interface and streaming capabilities. In this way, the enterprise of managed network 300 does not have to build and maintain its own servers for these operations.

Remote network management platform 320 may include modules that integrate with third-party networks 340 to expose virtual machines and managed services therein to managed network 300. The modules may allow users to request virtual resources and provide flexible reporting for third-party networks 340. In order to establish this functionality, a user from managed network 300 might first establish an account with third-party networks 340, and request a set of associated resources. Then, the user may enter the account information into the appropriate modules of remote network management platform 320. These modules may then automatically discover the manageable resources in the account, and also provide reports related to usage, performance, and billing.

Internet 350 may represent a portion of the global Internet. However, Internet 350 may alternatively represent a different type of network, such as a private wide-area or local-area packet-switched network.

Figure 4:
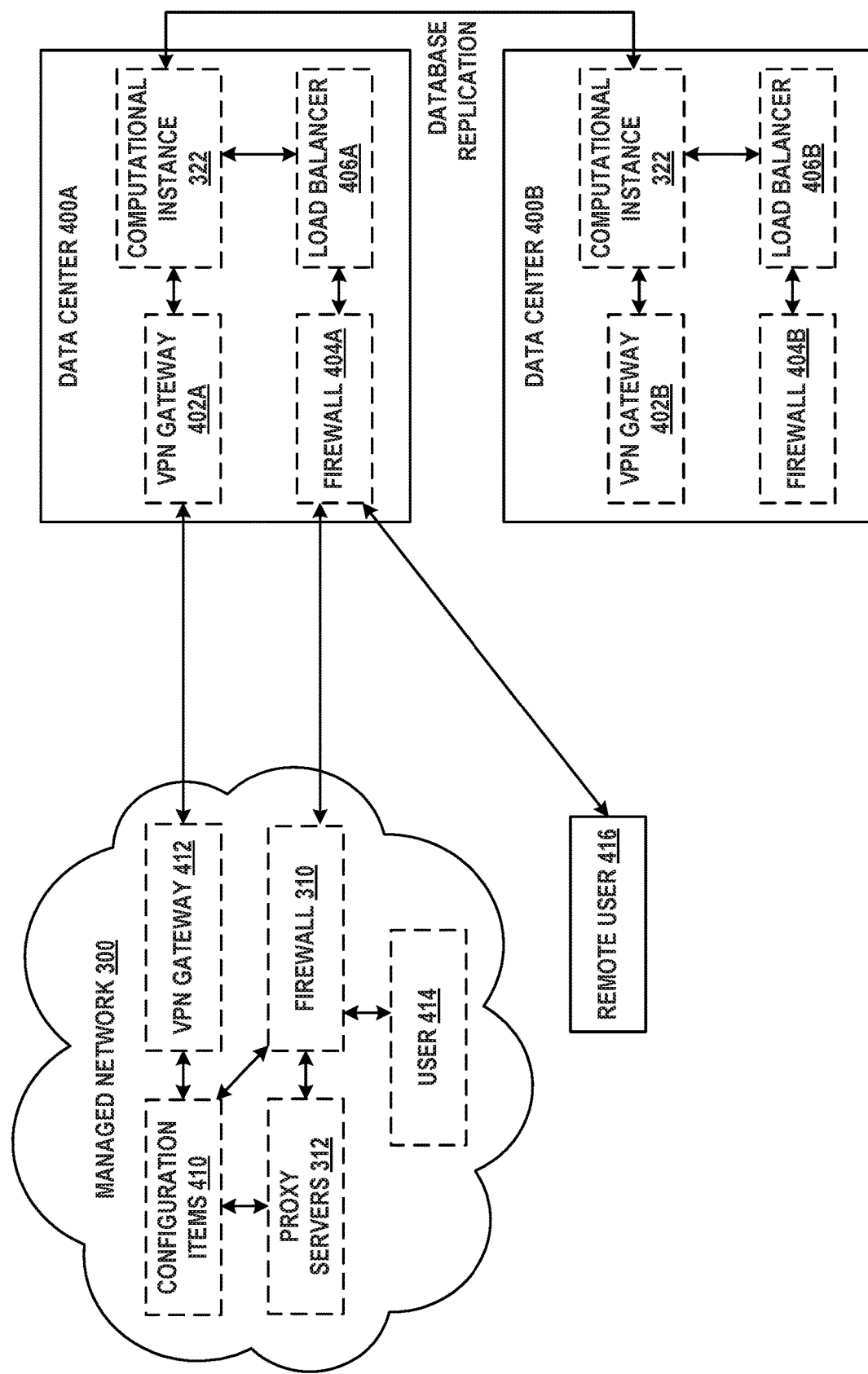
FIG. 4 depicts a communication environment involving a remote network management architecture, in accordance with example embodiments.

FIG. 4 further illustrates the communication environment between managed network 300 and computational instance 322, and introduces additional features and alternative embodiments. In FIG. 4, computational instance 322 is replicated across data centers 400A and 400B. These data centers may be geographically distant from one another, perhaps in different cities or different countries. Each data center includes support equipment that facilitates communication with managed network 300, as well as remote users.

In data center 400A, network traffic to and from external devices flows either through VPN gateway 402A or firewall 404A. VPN gateway 402A may be peered with VPN gateway 412 of managed network 300 by way of a security protocol such as Internet Protocol Security (IPSEC) or Transport Layer Security (TLS). Firewall 404A may be configured to allow access from authorized users, such as user 414 and remote user 416, and to deny access to unauthorized users. By way of firewall 404A, these users may access computational instance 322, and possibly other computational instances. Load balancer 406A may be used to distribute traffic amongst one or more physical or virtual server devices that host computational instance 322. Load balancer 406A may simplify user access by hiding the internal configuration of data center 400A, (e.g., computational instance 322) from client devices. For instance, if computational instance 322 includes multiple physical or virtual computing devices that share access to multiple databases, load balancer 406A may distribute network traffic and processing tasks across these computing devices and databases so that no one computing device or database is significantly busier than the others. In some embodiments, computational instance 322 may include VPN gateway 402A, firewall 404A, and load balancer 406A.

Data center 400B may include its own versions of the components in data center 400A. Thus, VPN gateway 402B, firewall 404B, and load balancer 406B may perform the same or similar operations as VPN gateway 402A, firewall 404A, and load balancer 406A, respectively. Further, by way of real-time or near-real-time database replication and/or other operations, computational instance 322 may exist simultaneously in data centers 400A and 400B.

Data centers 400A and 400B as shown in FIG. 4 may facilitate redundancy and high availability. In the configuration of FIG. 4, data center 400A is active and data center 400B is passive. Thus, data center 400A is serving all traffic to and from managed network 300, while the version of computational instance 322 in data center 400B is being updated in near-real-time. Other configurations, such as one in which both data centers are active, may be supported.

Should data center 400A fail in some fashion or otherwise become unavailable to users, data center 400B can take over as the active data center. For example, domain name system (DNS) servers that associate a domain name of computational instance 322 with one or more Internet Protocol (IP) addresses of data center 400A may re-associate the domain name with one or more IP addresses of data center 400B. After this re-association completes (which may take less than one second or several seconds), users may access computational instance 322 by way of data center 400B.

FIG. 4 also illustrates a possible configuration of managed network 300. As noted above, proxy servers 312 and user 414 may access computational instance 322 through firewall 310. Proxy servers 312 may also access configuration items 410. In FIG. 4, configuration items 410 may refer to any or all of client devices 302, server devices 304, routers 306, and virtual machines 308, any applications or services executing thereon, as well as relationships between devices, applications, and services. Thus, the term "configuration items" may be shorthand for any physical or virtual device, or any application or service remotely discoverable or managed by computational instance 322, or relationships between discovered devices, applications, and services. Configuration items may be represented in a configuration management database (CMDB) of computational instance 322.

As noted above, VPN gateway 412 may provide a dedicated VPN to VPN gateway 402A. Such a VPN may be helpful when there is a significant amount of traffic between managed network 300 and computational instance 322, or security policies otherwise suggest or require use of a VPN between these sites. In some embodiments, any device in managed network 300 and/or computational instance 322 that directly communicates via the VPN is assigned a public IP address. Other devices in managed network 300 and/or computational instance 322 may be assigned private IP addresses (e.g., IP addresses selected from the 10.0.0.0-10.255.255.255 or 192.168.0.0-192.168.255.255 ranges, represented in shorthand as subnets 10.0.0.0/8 and 192.168.0.0/16, respectively).

IV. Example Device, Application, and Service Discovery

In order for remote network management platform 320 to administer the devices, applications, and services of managed network 300, remote network management platform 320 may first determine what devices are present in managed network 300, the configurations and operational statuses of these devices, and the applications and services provided by the devices, and well as the relationships between discovered devices, applications, and services. As noted above, each device, application, service, and relationship may be referred to as a configuration item. The process of defining configuration items within managed network 300 is referred to as discovery, and may be facilitated at least in part by proxy servers 312.

For purpose of the embodiments herein, an "application" may refer to one or more processes, threads, programs, client modules, server modules, or any other software that executes on a device or group of devices. A "service" may refer to a high-level capability provided by multiple applications executing on one or more devices working in conjunction with one another. For example, a high-level web service may involve multiple web application server threads executing on one device and accessing information from a database application that executes on another device.

Figure 5A:
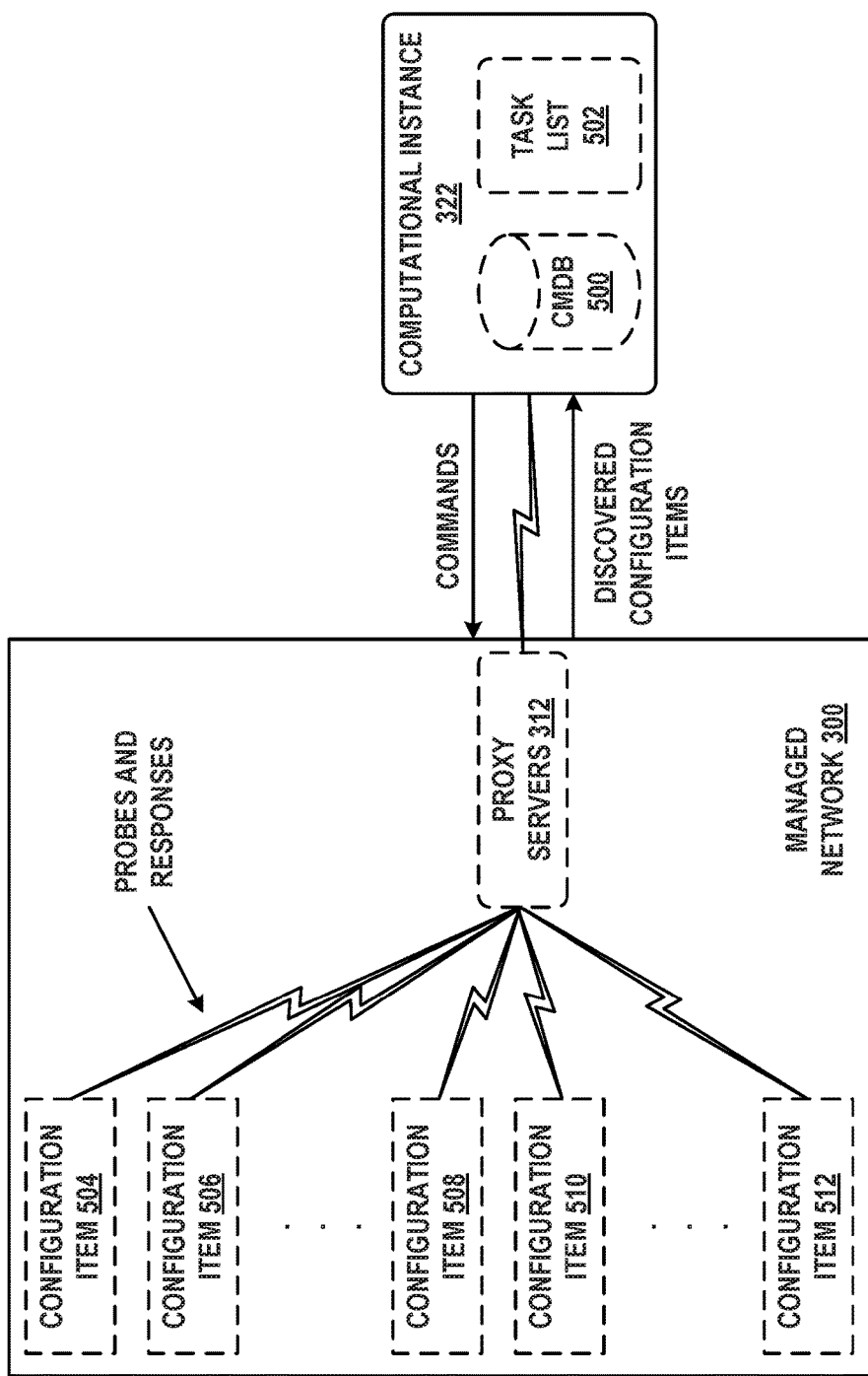
FIG. 5A depicts another communication environment involving a remote network management architecture, in accordance with example embodiments.

FIG. 5A provides a logical depiction of how configuration items can be discovered, as well as how information related to discovered configuration items can be stored. For sake of simplicity, remote network management platform 320, third-party networks 340, and Internet 350 are not shown.

In FIG. 5A, CMDB 500 and task list 502 are stored within computational instance 322. Computational instance 322 may transmit discovery commands to proxy servers 312. In response, proxy servers 312 may transmit probes to various devices, applications, and services in managed network 300. These devices, applications, and services may transmit responses to proxy servers 312, and proxy servers 312 may then provide information regarding discovered configuration items to CMDB 500 for storage therein. Configuration items stored in CMDB 500 represent the environment of managed network 300.

Task list 502 represents a list of activities that proxy servers 312 are to perform on behalf of computational instance 322. As discovery takes place, task list 502 is populated. Proxy servers 312 repeatedly query task list 502, obtain the next task therein, and perform this task until task list 502 is empty or another stopping condition has been reached.

To facilitate discovery, proxy servers 312 may be configured with information regarding one or more subnets in managed network 300 that are reachable by way of proxy servers 312. For instance, proxy servers 312 may be given the IP address range 192.168.0/24 as a subnet. Then, computational instance 322 may store this information in CMDB 500 and place tasks in task list 502 for discovery of devices at each of these addresses.

FIG. 5A also depicts devices, applications, and services in managed network 300 as configuration items 504, 506, 508, 510, and 512. As noted above, these configuration items represent a set of physical and/or virtual devices (e.g., client devices, server devices, routers, or virtual machines), applications executing thereon (e.g., web servers, email servers, databases, or storage arrays), relationships therebetween, as well as services that involve multiple individual configuration items.

Placing the tasks in task list 502 may trigger or otherwise cause proxy servers 312 to begin discovery. Alternatively or additionally, discovery may be manually triggered or automatically triggered based on triggering events (e.g., discovery may automatically begin once per day at a particular time).

In general, discovery may proceed in four logical phases: scanning, classification, identification, and exploration. Each phase of discovery involves various types of probe messages being transmitted by proxy servers 312 to one or more devices in managed network 300. The responses to these probes may be received and processed by proxy servers 312, and representations thereof may be transmitted to CMDB 500. Thus, each phase can result in more configuration items being discovered and stored in CMDB 500.

In the scanning phase, proxy servers 312 may probe each IP address in the specified range of IP addresses for open Transmission Control Protocol (TCP) and/or User Datagram Protocol (UDP) ports to determine the general type of device. The presence of such open ports at an IP address may indicate that a particular application is operating on the device that is assigned the IP address, which in turn may identify the operating system used by the device. For example, if TCP port 135 is open, then the device is likely executing a WINDOWS® operating system. Similarly, if TCP port 22 is open, then the device is likely executing a UNIX® operating system, such as LINUX®. If UDP port 161 is open, then the device may be able to be further identified through the Simple Network Management Protocol (SNMP). Other possibilities exist. Once the presence of a device at a particular IP address and its open ports have been discovered, these configuration items are saved in CMDB 500.

In the classification phase, proxy servers 312 may further probe each discovered device to determine the version of its operating system. The probes used for a particular device are based on information gathered about the devices during the scanning phase. For example, if a device is found with TCP port 22 open, a set of UNIX®-specific probes may be used. Likewise, if a device is found with TCP port 135 open, a set of WINDOWS®-specific probes may be used. For either case, an appropriate set of tasks may be placed in task list 502 for proxy servers 312 to carry out. These tasks may result in proxy servers 312 logging on, or otherwise accessing information from the particular device. For instance, if TCP port 22 is open, proxy servers 312 may be instructed to initiate a Secure Shell (SSH) connection to the particular device and obtain information about the operating system thereon from particular locations in the file system. Based on this information, the operating system may be determined. As an example, a UNIX® device with TCP port 22 open may be classified as AIX®, HPUX, LINUX®, MACOS®, or SOLARIS®. This classification information may be stored as one or more configuration items in CMDB 500.

In the identification phase, proxy servers 312 may determine specific details about a classified device. The probes used during this phase may be based on information gathered about the particular devices during the classification phase. For example, if a device was classified as LINUX®, a set of LINUX®-specific probes may be used. Likewise, if a device was classified as WINDOWS® 2012, as a set of WINDOWS®-2012-specific probes may be used. As was the case for the classification phase, an appropriate set of tasks may be placed in task list 502 for proxy servers 312 to carry out. These tasks may result in proxy servers 312 reading information from the particular device, such as basic input/output system (BIOS) information, serial numbers, network interface information, media access control address (es) assigned to these network interface(s), IP address(es) used by the particular device and so on. This identification information may be stored as one or more configuration items in CMDB 500.

In the exploration phase, proxy servers 312 may determine further details about the operational state of a classified device. The probes used during this phase may be based on information gathered about the particular devices during the classification phase and/or the identification phase. Again, an appropriate set of tasks may be placed in task list 502 for proxy servers 312 to carry out. These tasks may result in proxy servers 312 reading additional information from the particular device, such as processor information, memory information, lists of running processes (applications), and so on. Once more, the discovered information may be stored as one or more configuration items in CMDB 500.

Running discovery on a network device, such as a router, may utilize SNMP. Instead of or in addition to determining a list of running processes or other application-related information, discovery may determine additional subnets known to the router and the operational state of the router's network interfaces (e.g., active, inactive, queue length, number of packets dropped, etc.). The IP addresses of the additional subnets may be candidates for further discovery procedures. Thus, discovery may progress iteratively or recursively.

Once discovery completes, a snapshot representation of each discovered device, application, and service is available in CMDB 500. For example, after discovery, operating system version, hardware configuration and network configuration details for client devices, server devices, and routers in managed network 300, as well as applications executing thereon, may be stored. This collected information may be presented to a user in various ways to allow the user to view the hardware composition and operational status of devices, as well as the characteristics of services that span multiple devices and applications.

Furthermore, CMDB 500 may include entries regarding dependencies and relationships between configuration items. More specifically, an application that is executing on a particular server device, as well as the services that rely on this application, may be represented as such in CMDB 500. For instance, suppose that a database application is executing on a server device, and that this database application is used by a new employee onboarding service as well as a payroll service. Thus, if the server device is taken out of operation for maintenance, it is clear that the employee onboarding service and payroll service will be impacted. Likewise, the dependencies and relationships between configuration items may be able to represent the services impacted when a particular router fails.

In general, dependencies and relationships between configuration items may be displayed on a web-based interface and represented in a hierarchical fashion. Thus, adding, changing, or removing such dependencies and relationships may be accomplished by way of this interface.

Furthermore, users from managed network 300 may develop workflows that allow certain coordinated activities to take place across multiple discovered devices. For instance, an IT workflow might allow the user to change the common administrator password to all discovered LINUX® devices in a single operation.

In order for discovery to take place in the manner described above, proxy servers 312, CMDB 500, and/or one or more credential stores may be configured with credentials for one or more of the devices to be discovered. Credentials may include any type of information needed in order to access the devices. These may include userid/password pairs, certificates, and so on. In some embodiments, these credentials may be stored in encrypted fields of CMDB 500. Proxy servers 312 may contain the decryption key for the credentials so that proxy servers 312 can use these credentials to log on to or otherwise access devices being discovered.

Figure 5B:
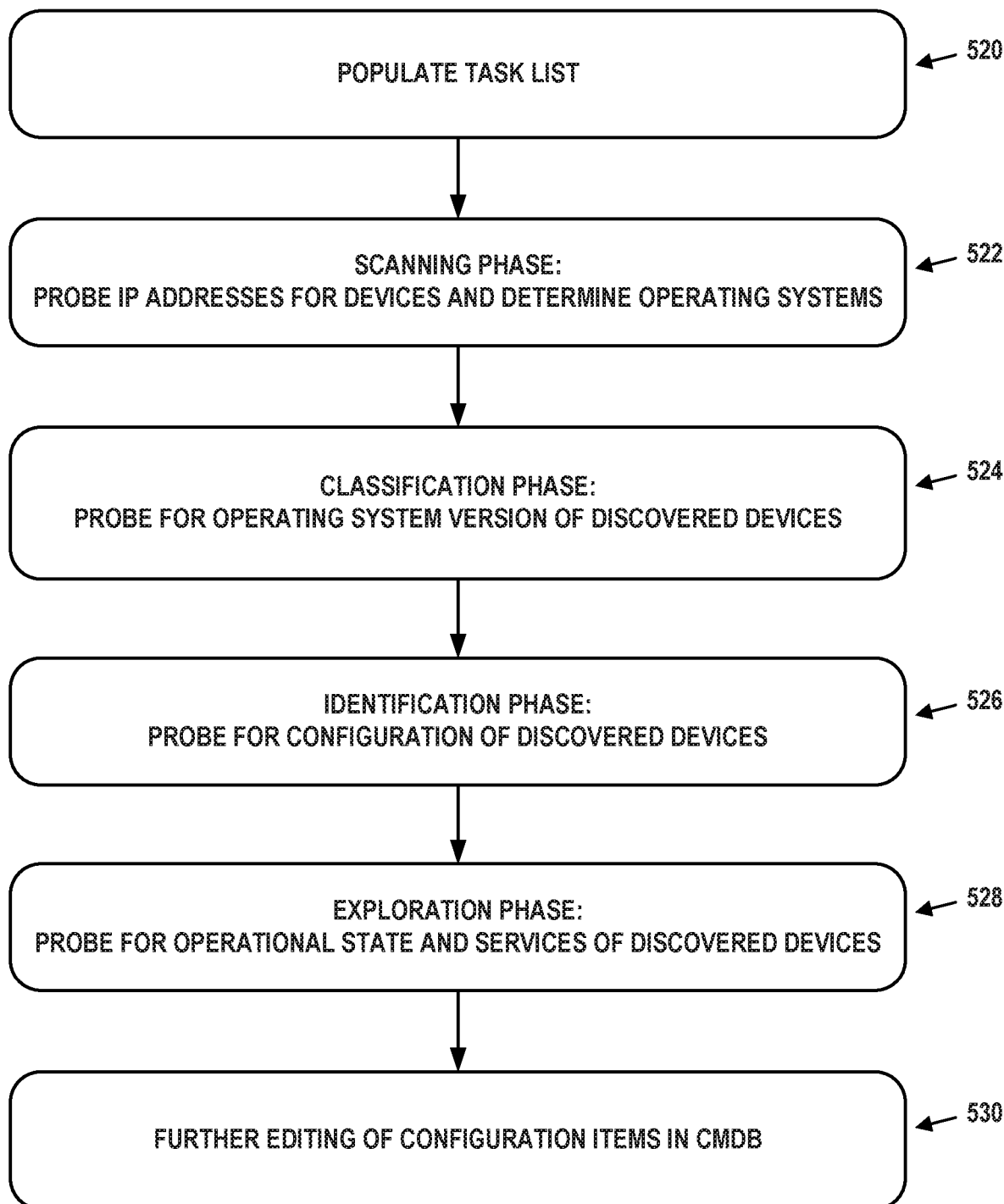
FIG. 5B is a flow chart, in accordance with example embodiments.

The discovery process is depicted as a flow chart in FIG. 5B. At block 520, the task list in the computational instance is populated, for instance, with a range of IP addresses. At block 522, the scanning phase takes place. Thus, the proxy servers probe the IP addresses for devices using these IP addresses, and attempt to determine the operating systems that are executing on these devices. At block 524, the classification phase takes place. The proxy servers attempt to determine the operating system version of the discovered devices. At block 526, the identification phase takes place. The proxy servers attempt to determine the hardware and/or software configuration of the discovered devices. At block 528, the exploration phase takes place. The proxy servers attempt to determine the operational state and applications executing on the discovered devices. At block 530, further editing of the configuration items representing the discovered devices and applications may take place. This editing may be automated and/or manual in nature.

The blocks represented in FIG. 5B are for purpose of example. Discovery may be a highly configurable procedure that can have more or fewer phases, and the operations of each phase may vary. In some cases, one or more phases may be customized, or may otherwise deviate from the exemplary descriptions above.

V. Example Workflow Design Tool

Computational instances of the remote network management platform discussed herein may enable the specification and execution of workflows on behalf of their respective managed networks. A workflow is a specific sequence or series of tasks that, when performed, accomplish one or more goals. In some cases, workflows may be represented as flow charts, with one or more starting states, intermediate states, and ending states connected by various transitions therebetween. Some states may be visited zero times or more than one time. Also, some states may have more than one possible next state, thus representing a decision to be made in the workflow, either based on user input, automated input, information stored in a database, or by way of other mechanisms. Triggers may also be defined that cause certain transitions between states, input to be acquired, or output to be produced.

Such a workflow can be implemented on a computational instance through use of a software-based workflow design tool. Such a tool presents the workflow designer with options for defining the states, transitions, triggers, actions, input data, output data, and other characteristics of the workflow. The tool may utilize a GUI, and may be embodied as a series of one or more web pages and/or web-based applications deployed upon the computational instance. Once completed and released, employees of the managed network may make use of the workflow to carry out various tasks in an organized and efficient fashion. Notably, the workflow design tool can be a so-called "low-code/no-code" solution, with which designers either write very little program code, or no code at all, to implement the workflow.

While the embodiments herein provide support for general workflow design, an example workflow design tool may be implemented based around specific definitions of triggers, actions, and workflow logic. Triggers may be used to specify conditions that start a workflow, such as a change to an entry in a database (e.g., the addition or updating of a configuration item in a CMDB) or according to a schedule (e.g., once per day or once per week). A trigger causes one or more actions to be performed, and each action may be controlled by workflow logic that specifies the conditions that must be true for the action to be performed. The action may involve changing the state of information in a database, sending a notification (e.g., an email) to a user, and so on.

In some cases, sub-flows may be defined and incorporated into a workflow. A sub-flow may be an automated or semi-automated process including a sequence of reusable actions and specific data inputs that allow it to be started from within a flow, another sub-flow, or script. Thus, sub-flows can be applied to multiple workflows.

As an illustrative example of a workflow, consider an employee offboarding scenario, in which an employee has left an enterprise for some reason (e.g., the employee quit, got fired, passed away, etc.). The goals of the workflow are to: (i) look up and cancel any pending catalog requests (e.g., equipment requisitions) opened by the departed employee, and (ii) reassign any open tasks (e.g., pending approvals, units of work that are to be accomplished) assigned to the departed employee to his or her manager. In various embodiments, more or fewer goals may be present.

Figure 6A:
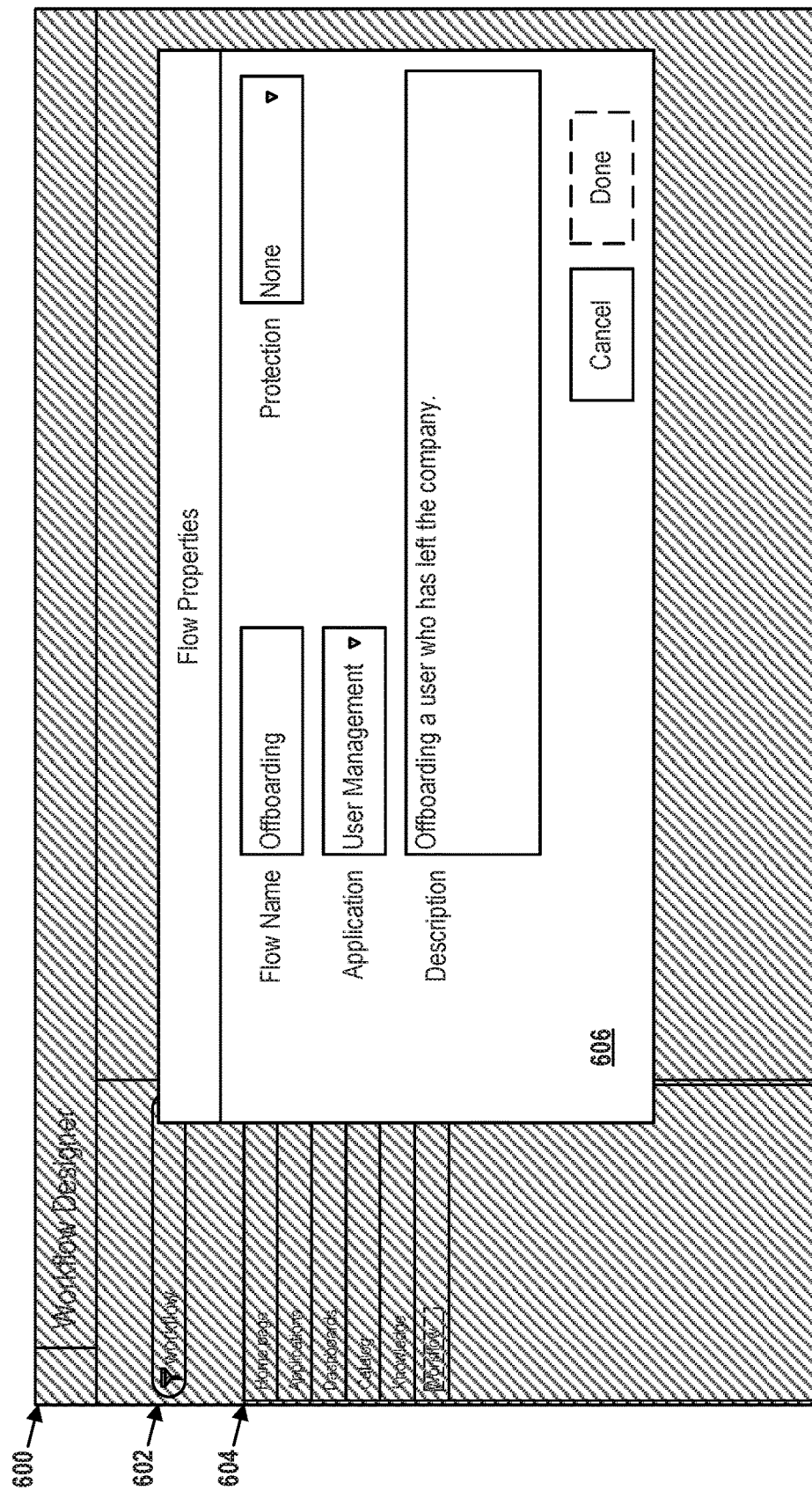

The workflow design tool may present the designer with a series of GUI pages that allow the designer to specify the workflow. Examples of such pages are shown in FIGS. 6A-6J, while results of an automated test of the workflow are shown in FIG. 6K. Notably, these examples are merely for purposes of illustration and not intended to be limiting. The workflow design tool may be able to provide other GUIs including alternative arrangements of information usable for designing workflows.

FIG. 6A depicts GUI 600. The background of GUI 600 shows a web-based menu for selecting features and/or applications supported by a computational instance. This background is denoted as such by hash marks.

For example, GUI 600 includes dialog box 602 in which a user has entered the search term "workflow". This selects the workflow design tool from the bottom of menu 604. This selection is reflected by the text "Workflow Designer" appearing at the top of GUI 600.

GUI 600 also includes pop up window 606. Alternatively, window 606 may be a pane overlaid on top of GUI 600 and not a separate window. Regardless, window 606 allows a user to initiate creation of a new workflow by specifying its properties. In GUI 600, these properties are the workflow's name "Offboarding", the workflow's scoped application "User Management", the workflow's description "Offboarding a user who has left the company", and whether the workflow is to be protected. In alternative embodiments more or fewer properties may be specified.

The workflow's name may be free-form text entered by the user. The workflow's scoped application may be selected from a drop-down menu of applications or specified as global. As the workflow in GUI 600 is limited to the "User Management" scoped application, this workflow may be considered to be part of this application. The workflow's description may also be free-form text. The workflow's protection specifies whether it is modifiable ("none") or read-only ("read-only") by other workflow designers or users.

Once the user is satisfied with the information entered in window 606, the user may select or otherwise activate the "Done" button. This selection is denoted in FIG. 6A by this button being depicted with a dashed line. Once the user completes the dialog of window 606, the next phase of the workflow design tool, which allows the user to specify a trigger, may be displayed.

Figure 6B:
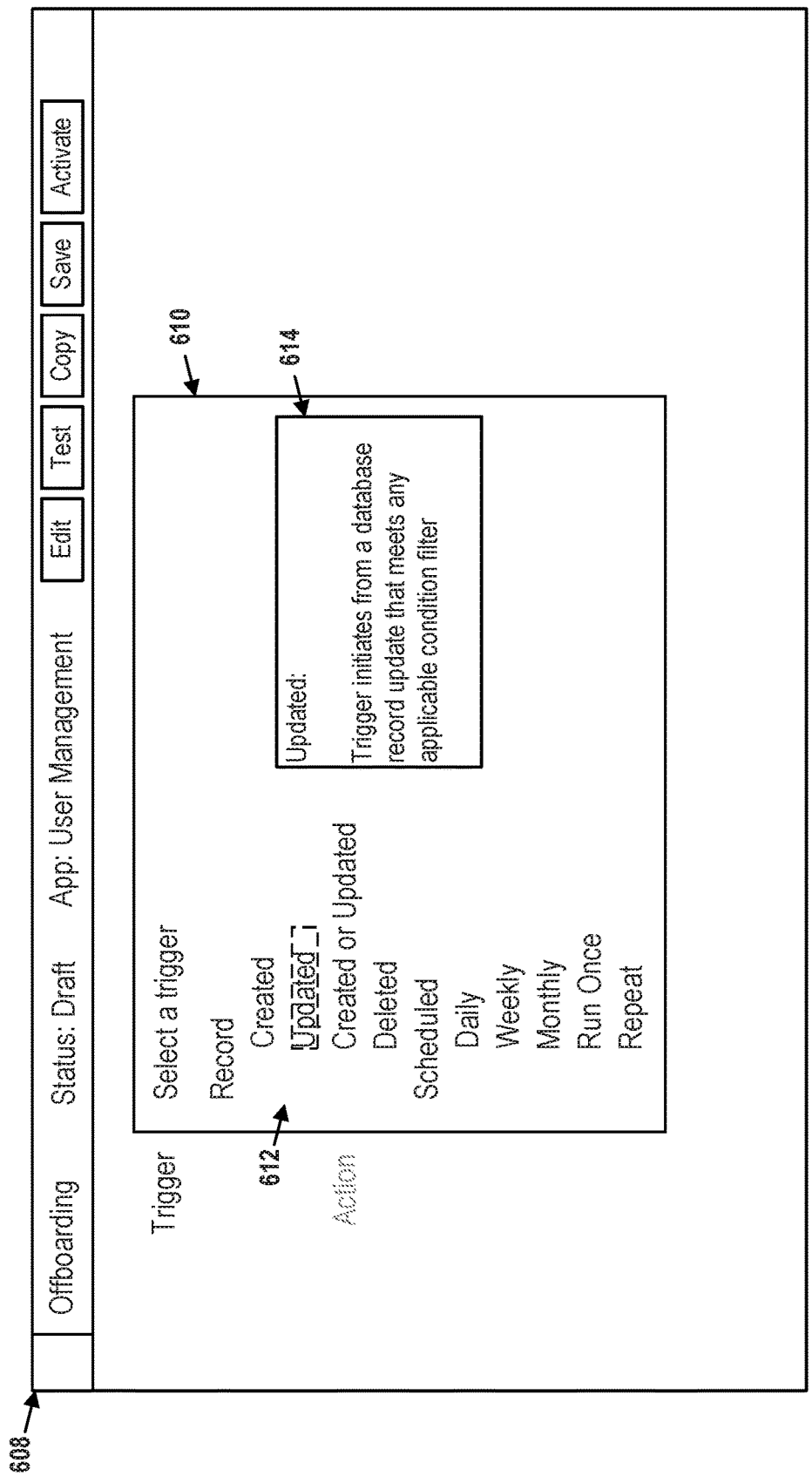

FIG. 6B depicts the first part of the trigger specification phase in GUI 608. The top of GUI 608 specifies the workflow's name, "Offboarding", as entered into window 606. This section of GUI 608 also indicates that this workflow is currently in draft form and is part of the "User Management" scoped application. GUI 608 further displays a series of buttons that allow a user to edit, test, copy, save, and activate the workflow, respectively. In alternative embodiments, different types of information about the workflow may be displayed, and there may be more or fewer buttons potentially with different functionality.

Notably, hashmarks are omitted from the background of GUI 608 (as well as all further GUIs) for purposes of readability. Also, the word "Trigger" is shown in a regular, dark color to indicate that a trigger is being specified, while the word "Action" is shown in a lighter color to indicate that action specification is not taking place.

Pop up window 610 (which, like window 606, may be a pane overlaid on top of GUI 608 and not a separate window), may allow a user to specify a trigger for the workflow. As noted previously, two main types of triggers may be supported and these types are shown in menu 612. Record-based triggers may cause a workflow to be performed when a change to one or more specific database records occurs. As depicted in menu 612, these changes may include creation of a record, updating of a record, creation or updating of a record, and deletion of a record. Scheduled triggers may cause a workflow to be performed at one or more specified times. As depicted in menu 612, such a schedule may trigger a workflow daily, weekly, monthly, just once (at a specified time), or to repeat at a user-specified interval.

In FIG. 6B, menu 612 indicates, with a dashed line, that the user has selected a trigger for when a record is updated. This may cause information box 614 to be displayed, which explains the behavior of the selected trigger.

Figure 6C:
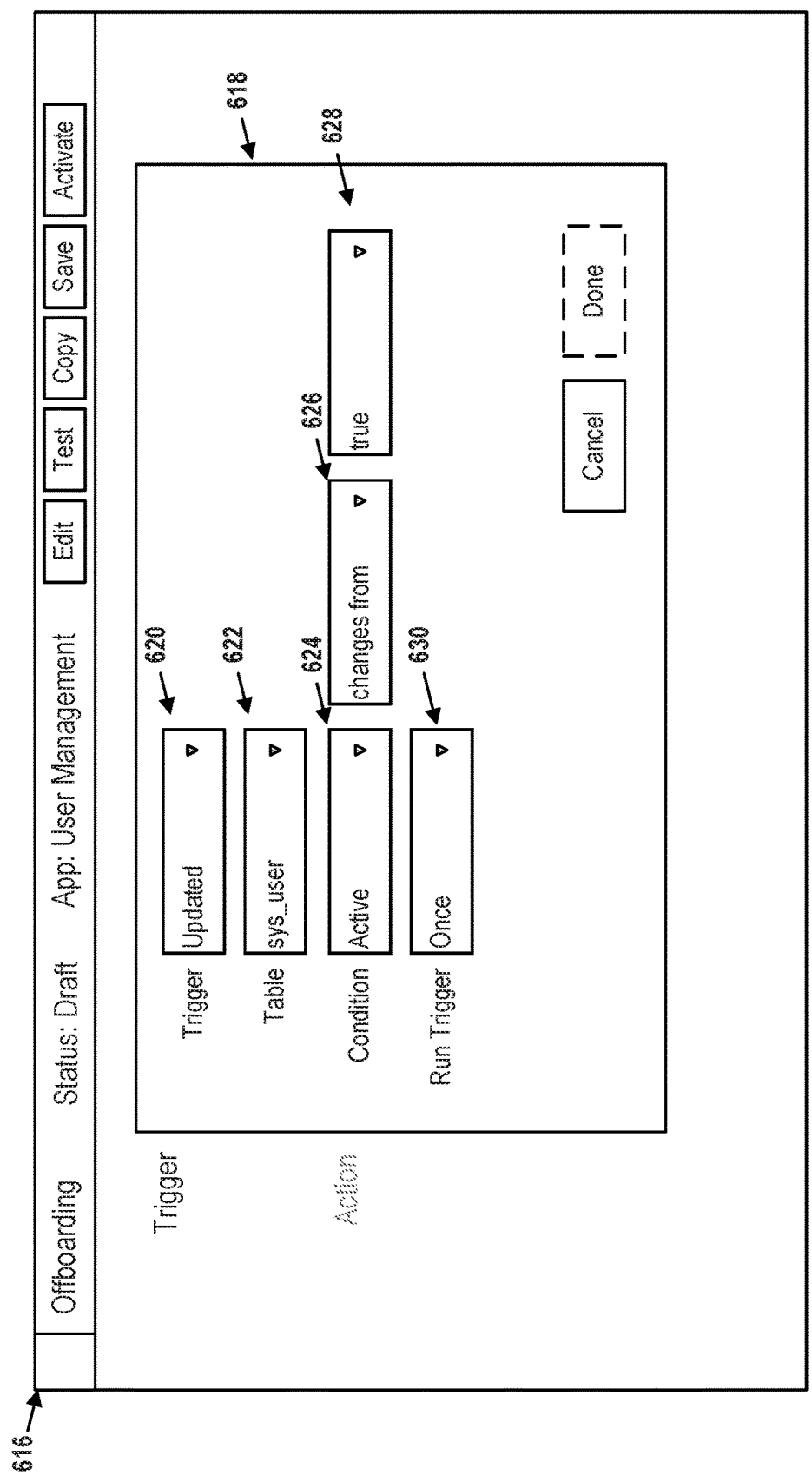

FIG. 6C depicts the second part of the trigger specification phase in GUI 616. GUI 616 assumes that the selection shown in FIG. 6B has been finalized. Thus, GUI 616 depicts pop up window 618 (which, like window 606, may be a pane overlaid on top of GUI 616 and not a separate window), that may allow a user to further specify a trigger for the workflow.

Window 618 contains a number of drop-down menus, some of which may be automatically populated based on the user's selection(s) from GUI 608. Particularly, trigger menu 620 may be populated to reflect the user's selection of the "Updated" option, and run trigger menu 630 may be populated to reflect that record-based triggers are expected to just run once. Nonetheless, the user may modify these selections in window 618.

Table menu 622 allows the user to specify a database table in which records can be found. As shown, this table is sys_user, which is assumed to contain one entry for each employee in the company. Table menu 622 may be capable of displaying a list of one or more available tables.

Condition menus 624, 626, and 628 allow the user to specify a condition of records in the selected table that will cause the workflow to be performed. This condition may be a state or a transition. For instance, condition menu 624 specifies "Active" to indicate that the records must be active, condition menu 626 specifies "changes from" to indicate records that change from active, and condition menu 628 specifies "true" to indicate any record that changes from active to another state.

In various embodiments, condition menu 624 may include entries for various fields in the sys_user table. These fields may include the phone number, building, city, department, address, manager, role, and so on. Condition menu 626 may include entries for "is", "is not", "is empty", "is not empty", "is anything", "is same as", "is different from" "changes", "changes from", "changes to", and/or various other logical operations. Condition menu 628 may include entries for items that are contextually based on the selections made for condition menus 624 and 626.

Viewed as a whole, the trigger specification of window 618 indicates that the workflow is to be performed once when any entry in the sys_user table is updated from active to another state (e.g., inactive). This would indicate that the user is no longer an active employee of the company.

Figure 6D:
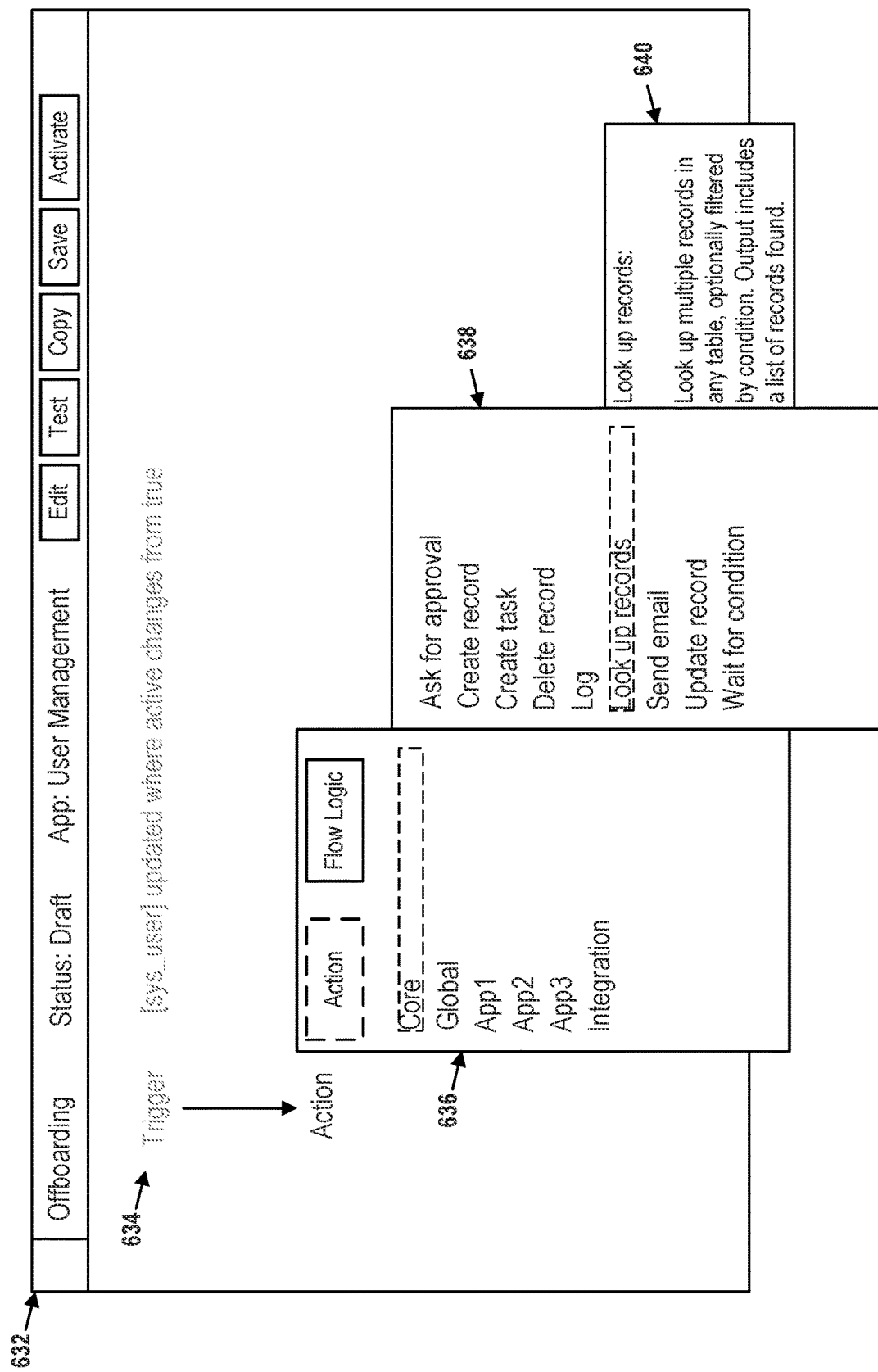

FIG. 6D depicts the first part of an action specification in GUI 632. Notably, at 634, the word "Trigger" is accompanied by a description of the trigger specified in FIGS. 6B and 6C. Further, this text is grayed in order to indicate that the trigger is no longer being specified.

As shown in menu 636, the user has the option of specifying an action or flow logic. The dashed line around the "Action" button indicates that an action is being specified. Particularly, menu 636 displays several contexts for the action being specified. For example, "Core" actions are supported by the computational instance as a default, while "Global" actions include all core actions, application-based, and integration-based actions. Application-based actions, "App1", "App2", and "App3", are actions supported by respective applications built on top of the remote network management platform. These may include, for example, various types of IT service management, IT operations management, customer service management, security operations, and CRM applications. Integration-based actions include actions defined by or supported by third-party applications integrated with the remote network management platform. These may include, for example, virtual chat applications, messaging applications, and so on. Each of these built-in or third-party applications may explicitly expose interfaces (referred to as "spokes") to the workflow design tool so that the workflow design tool can support workflows including data and/or functionality of these applications.

In FIG. 6D, the user has selected the "Core" context. Based on this selection, sub-menu 638 is displayed. This sub-menu provides the user the ability to select from a number of specific actions, such as "Ask for approval", "Create record", "Create task", "Delete record", "Log", "Look up records", "Send email", "Update record", and "Wait for condition". From these, the user has selected "Look up records". Accordingly, information box 640, that describes the selected action, may be displayed.

Figure 6E:
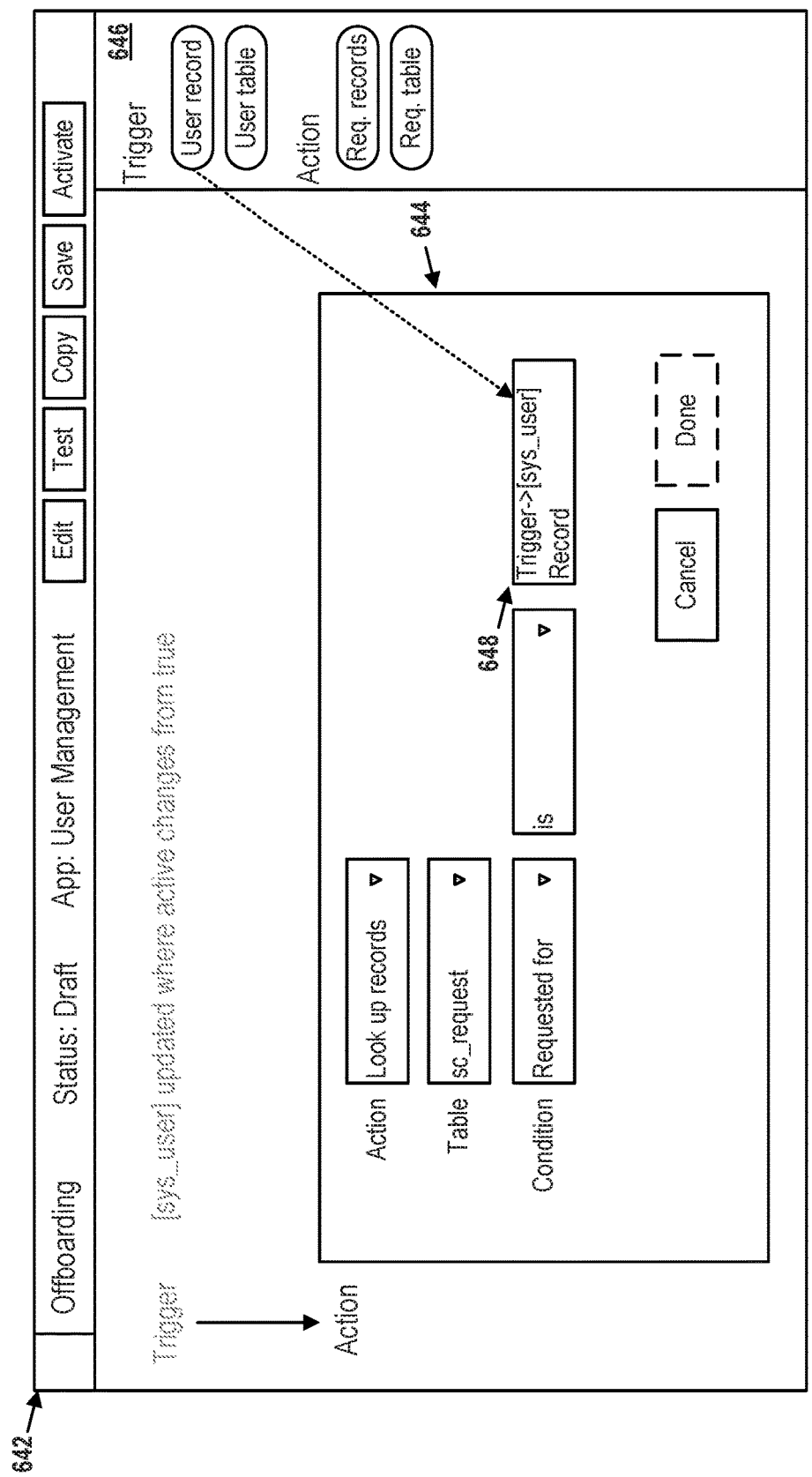

FIG. 6E depicts the second part of the action specification in GUI 642. Pop up window 644 (which, like window 606, may be a pane overlaid on top of GUI 642 and not a separate window), may allow specification of a table in which to look up records and the conditions that these records must meet. As shown in window 644, the action (as specified in FIG. 6D) is to look up records, and the table in which to perform this look up is sc_request (a table that contains catalog requests made by users). The records returned from sc_request are those where the "Requested for" field matches the user identified in the trigger step (i.e., a user whose active status has changed).

FIG. 6E also depicts column 646 containing pill-shaped user interface elements ("pills") arranged according to the previously-defined trigger as well as the action currently being defined. These pills are capable of being dragged from column 646 to the rightmost selectable item 648 in the condition field, as shown by the dotted arrow. User interface pills in this context are typically oval-shaped items that refer to data previously specified in the workflow and may be automatically placed in the user interface as this data is specified in the workflow design tool. In some embodiments, user interface chips or tags (with various shapes) may be used instead.

Notably, the two pills under the "Trigger" heading in column 646 refer to the user record(s) returned by the trigger (e.g., an entry in sys_user that changed from active to another state as specified in FIG. 6C) and the table upon which the trigger operates (e.g., sys_user as specified in FIG. 6C). The two pills under the "Action" heading in column 646 refer to the records found by the action being defined in FIG. 6E, as well as the table in which these records are located (e.g., sc_request).

The user interface elements, such as the pills in column 646, are a significant convenience for the user specifying the workflow, as they allow the user to easily include a reference to data or tables previously specified or referred to in the workflow. In this way, the user does not need to type in a specific reference to this information, and need only drag and drop a pill instead.

Once the user is satisfied with the information entered in window 644, the user may select or otherwise activate the "Done" button. This selection is denoted in FIG. 6E by this button being depicted with a dashed line. Once the user completes the dialog of window 644, the next phase of the workflow design tool, which allows the user to specify flow logic for the action, may be displayed.

Figure 6F:
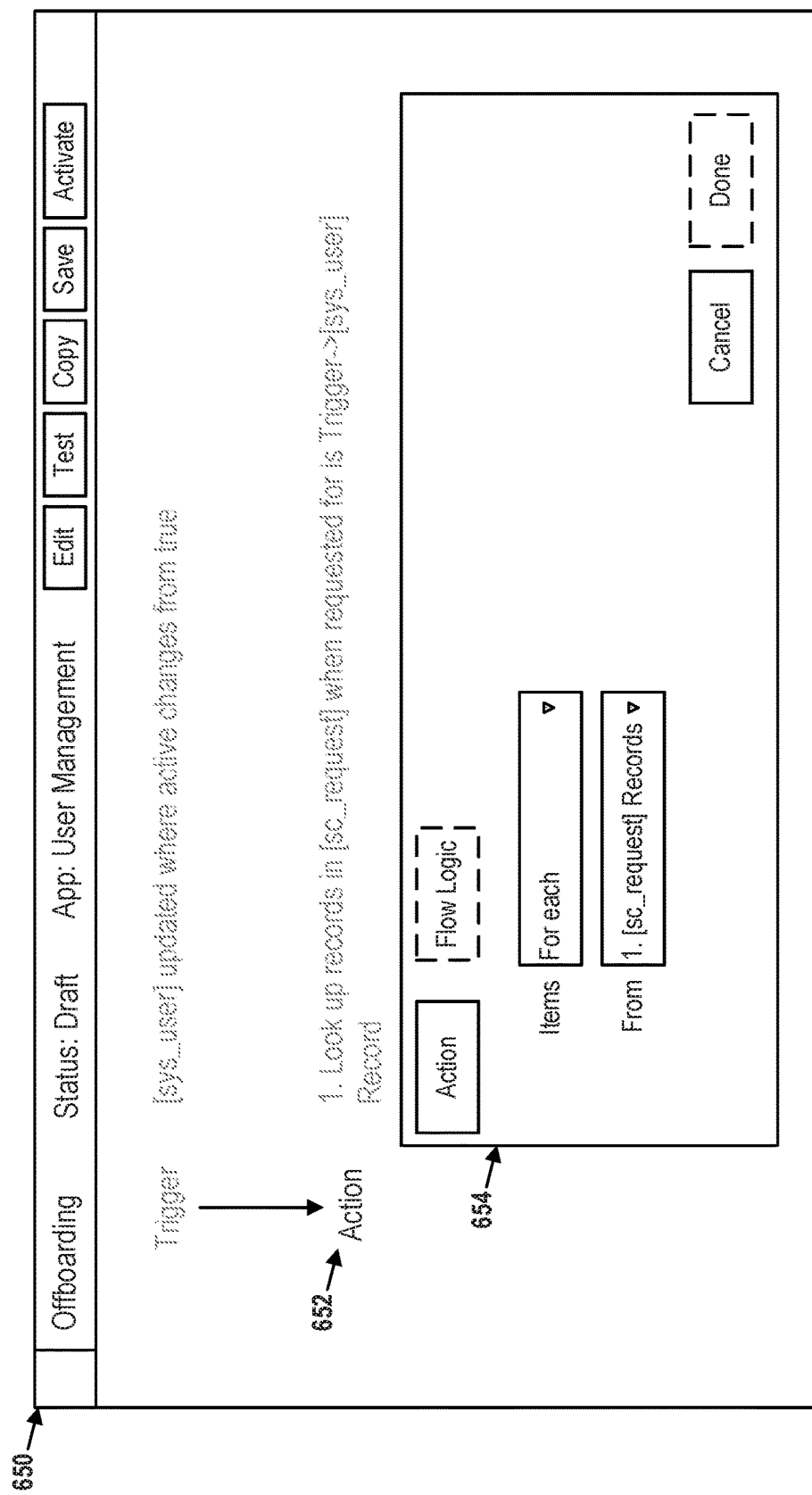

FIG. 6F depicts flow logic specification in GUI 650. Flow logic may be tied to an action, and specifies how the action is to be carried out. Notably, at 652 the word "Action" is annotated with a description of the action specified in FIGS. 6D and 6E.

Pop up window 654 may allow specification of whether the workflow operates on some or all items returned by the action specified in FIGS. 6D and 6E. The "Flow Logic" button is depicted with a dashed line to show that flow logic, rather than an action, is being specified. In this case, the selections made in window 654 indicate that the workflow operates on all items returned from the query specified in FIG. 6E. Notably, the "1. [sc_request] Records" value in the "From" field of window 654 indicates that the flow logic is to be applied to the output of Action 1, specified at 652. Notably, the value of the "From" field may be populated by a pill dragged and dropped from a column containing such pills. This column is not shown in FIG. 6F for purposes of simplicity, but may resemble column 646 of FIG. 6E.

Once the user is satisfied with the information entered in window 654, the user may select or otherwise activate the "Done" button. This selection is denoted in FIG. 6F by this button being depicted with a dashed line. Once the user completes the dialog of window 654, the next phase of the workflow design tool, which allows the user to specify a sub-action for the flow logic, may be displayed.

Figure 6G:
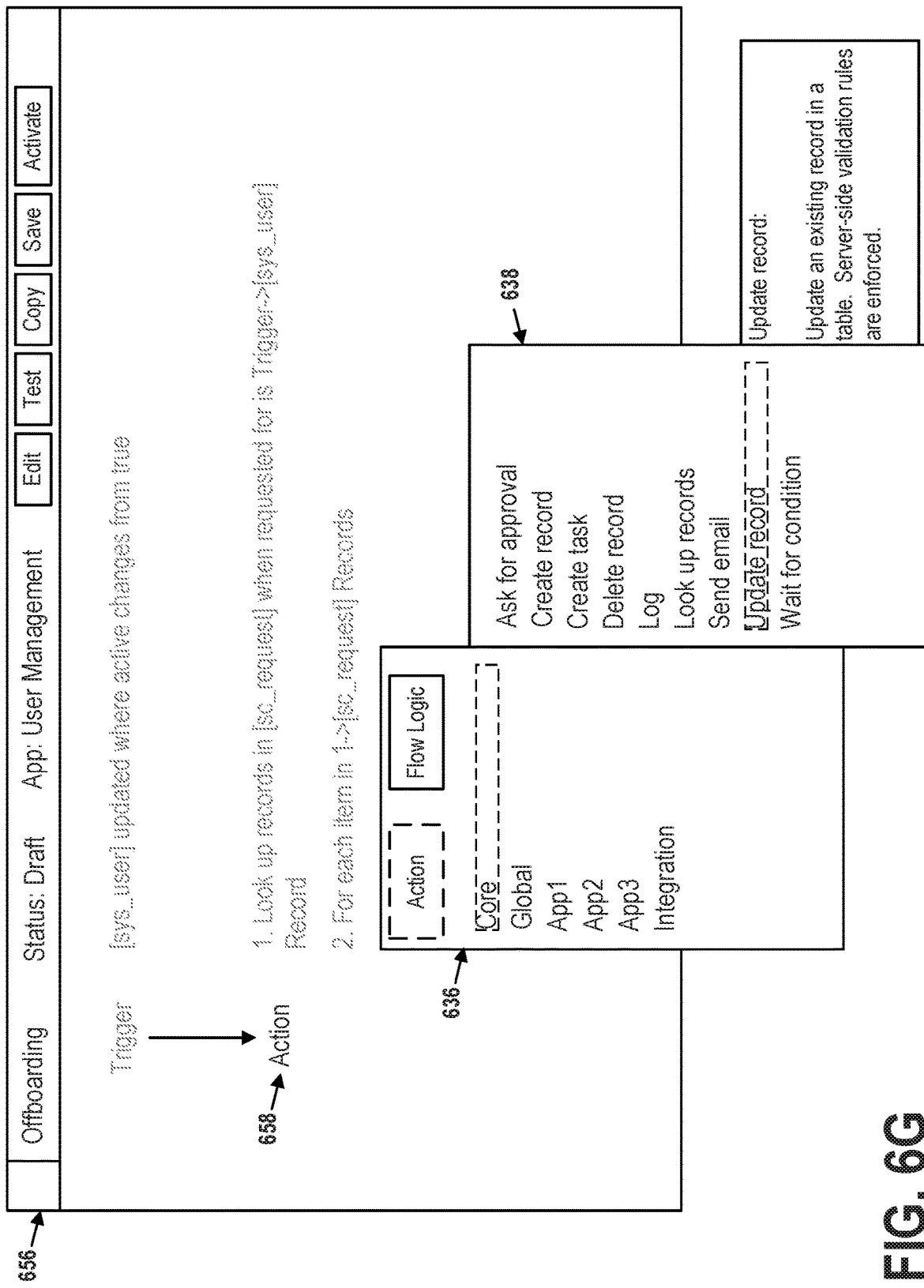

FIG. 6G depicts a sub-action specification in GUI 656. Notably, at 658, the word "Action" is accompanied by an updated description of the action and flow logic specified in FIGS. 6D, 6E, and 6F. Further, this text is grayed in order to indicate that the flow logic is no longer being specified. Notably, the sub-action specification once again displays menu 636 and sub-menu 638, this time with "Core" and "Update record" selected. Thus, GUI 656 depicts the user specifying that records will be updated for each item returned by the action defined in FIGS. 6D and 6E.

Figure 6H:
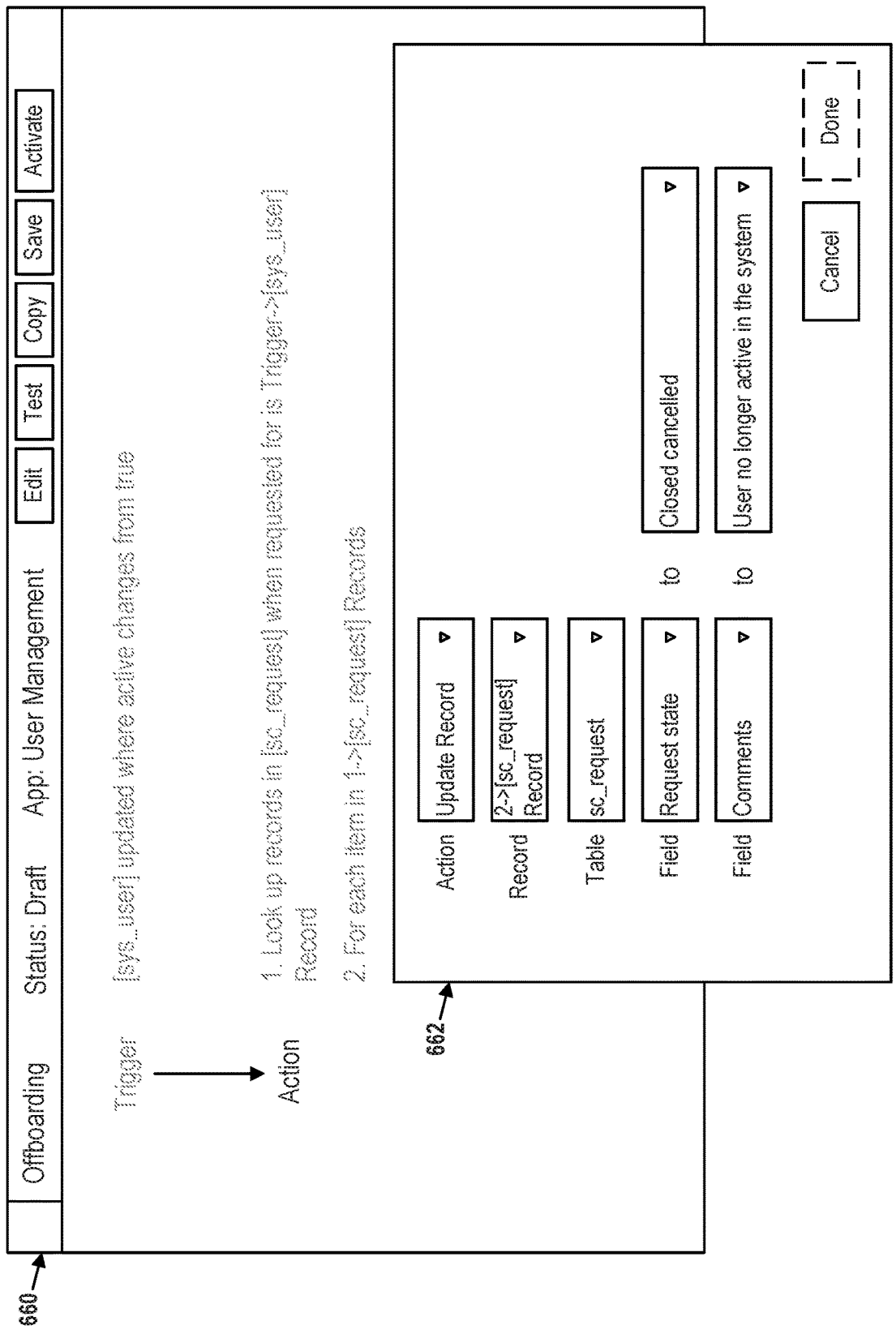

FIG. 6H continues this sub-action specification in GUI 660. Pop up window 662, may allow specification of actions to be taken on items returned by the flow logic specified in FIG. 6F. Particularly, the options shown in window 662 indicate that, for each record in the sys_user table that is returned by the trigger, any record in the sc_request table that was requested for the same user will be updated. The user also specifies two fields that are to be updated for matching records. The "Request state" field is to be updated to "Closed cancelled" to cancel the departed employee's pending catalog requests. The "Comments" field is also updated to "User no longer active in the system" to indicate why the request was cancelled.

Notably, the value of the "Record" field may be populated by a pill dragged and dropped from a column containing such pills. This column is not shown in FIG. 6H for purposes of simplicity, but may resemble column 646 of FIG. 6E.

Once the user is satisfied with the information entered in window 662, the user may select or otherwise activate the "Done" button. This selection is denoted in FIG. 6H by this button being depicted with a dashed line.

Figure 6I:
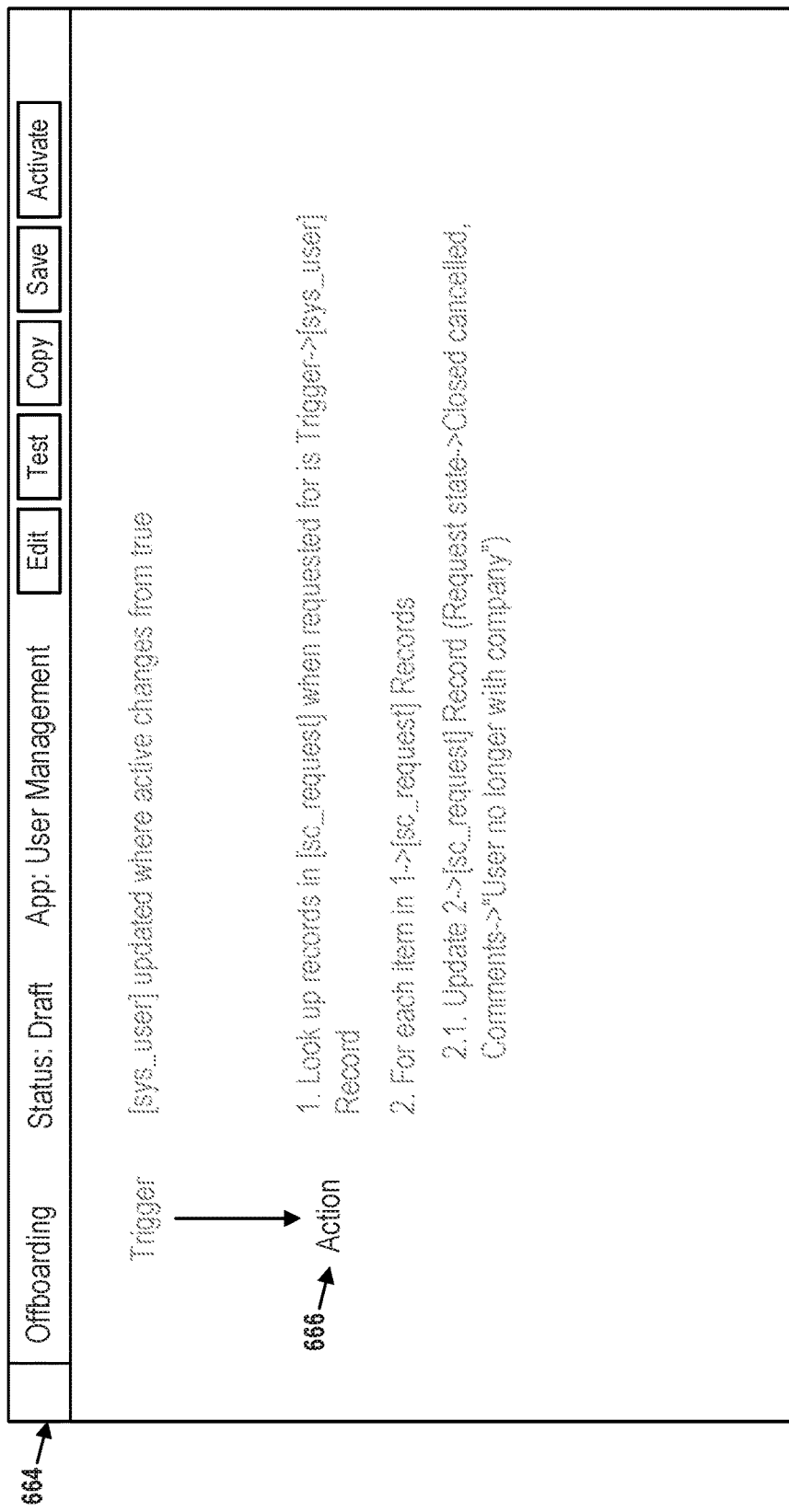

FIG. 6I shows GUI 664 depicting the workflow defined so far. At 666 the action specified in FIGS. 6D, 6E, 6F, 6G, and 6H is displayed. It is broken down into steps 1 (looking up records in the sc_request table that were requested for the employee identified by the trigger), 2 (for each these records, performing step/sub-action 2.1), and 2.1 (updating these records by closing them and adding an appropriate comment).

Figure 6J:
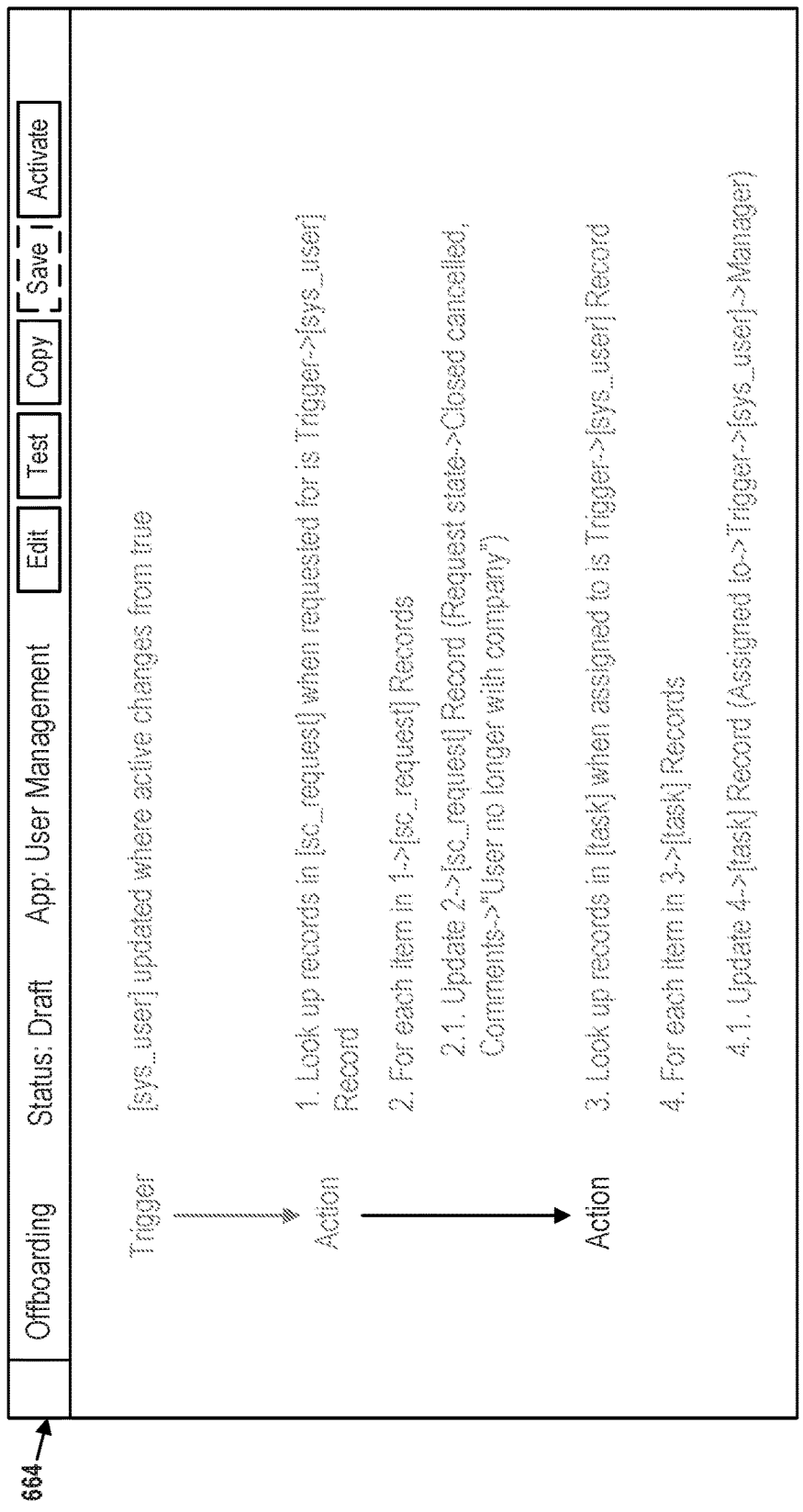

The rest of the desired workflow, as introduced above, also involves reassigning all tasks assigned to the departed employee to that person's manger. This further step is depicted in FIG. 6J. In order to avoid a degree of repetition, the GUIs for specifying the action, the flow logic, and the sub-action for task reassignment are omitted. Instead, FIG. 6J depicts GUI 664 updated to show the complete workflow.

Notably, step 3 looks up records in the task database table (which contains entries for tasks to be carried out by employees) that are assigned to the employee identified by the trigger. Step 4 specifies flow logic that, for each of these records, indicates that step/sub-action 4.1 is to be performed. Step 4.1 indicates that, for each record identified in step 4, the "Assigned to" field is to be changed to the manager of the identified employee.

In this way, arbitrarily complex flow-chart-like workflows can be rapidly designed in a data-centric fashion. The designer need not write any code, and is guided through the workflow specification by a series of GUIs that help the designer with appropriate menus and other interface elements. As a result, the designer saves a significant amount of time. In practice, experiments have shown that workflows can be specified in hours rather than the days typically needed for manually coding the workflows in a high-level programming language (e.g., JAVA®, JAVASCRIPT®, C++, and so on).

Another benefit of this workflow design tool is that it allows a workflow to be tested by the same GUI prior to deployment. FIG. 6K shows GUI 668, which contains the same information as GUI 660 from FIG. 6J, but also includes three columns reflecting the outcome of such a test. The "State" column indicates whether each step has been completed (in this example, all steps were completed), the "Start time" column indicates the time at which each step began, and the "Duration" column indicates how long each step took to be performed, in milliseconds. This allows the designer to verify that each step is properly performed, as well as to identify any steps that take an inordinate amount of time to complete. In alternative embodiments, other information may be displayed.

In the examples of FIGS. 6A-6K, a workflow is designed. The user persona that carries out such a process may be referred to as a workflow designer. However, actions may be designed in an analogous fashion (e.g., by way of similar GUIs) by a user with a persona of an action designer. Thus, an action designer may define custom actions that can be published, and published actions can be selected and incorporated into workflows by a workflow designer.

VI. An Action Design Tool with Dynamic Inputs

As noted above, a deficiency of current workflow tools is that they are hard-coded to work only with known third-party schema, and any changes to these tools to support customizations of these schemas requires writing and testing program code. Doing so is time consuming and error prone even for experienced software engineers, and serves as a barrier to entry for non-technical users.

The embodiments herein address these problems by allowing a schema that may be initially unknown when a workflow is being designed to be incorporated into the workflow. One way of doing so is by way of an action design tool with dynamic inputs, as discussed below in the context of FIGS. 7A-7F.

The assumed scenario for the embodiments illustrated by these figures (as well as FIGS. 8A-8F) is that an enterprise is using a remote, third-party HR service from the fictional rgb-hr.com. In this example, rgb-hr.com provides an outsourced HR database with pre-defined tables and fields therein. The fields may allow the enterprise to specify its employees' names, addresses, ages, personally identifying information, and so on. The rgb-hr.com service may provide access to these tables by way of various application programming interfaces (APIs), such as representational state transfer (REST) and simple object access protocol (SOAP) APIs. Other methods of accessing such information may include SSH, Java Database Connectivity (JDBC), POWERSHELL®, and so on—thus, the information may be on-premise with respect to the enterprise or remotely accessible. Further, the rgb-hr.com service may allow individual enterprises to customize their tables by adding fields, removing fields, and/or changing the names of fields, as well as by adding tables, removing tables, and/or changing the names of tables.

For example, the enterprise might add custom fields to its employee table to include a badge identification number, a professional registration number, a list of certifications, and so on. Thus, if an enterprise makes such a customization, it would also have to develop the program code that supports workflow definition so that the new fields can be integrated therein. Otherwise, workflows would be unable to access or use the custom fields, which could dramatically reduce the utility of these workflows.

Figure 7A:
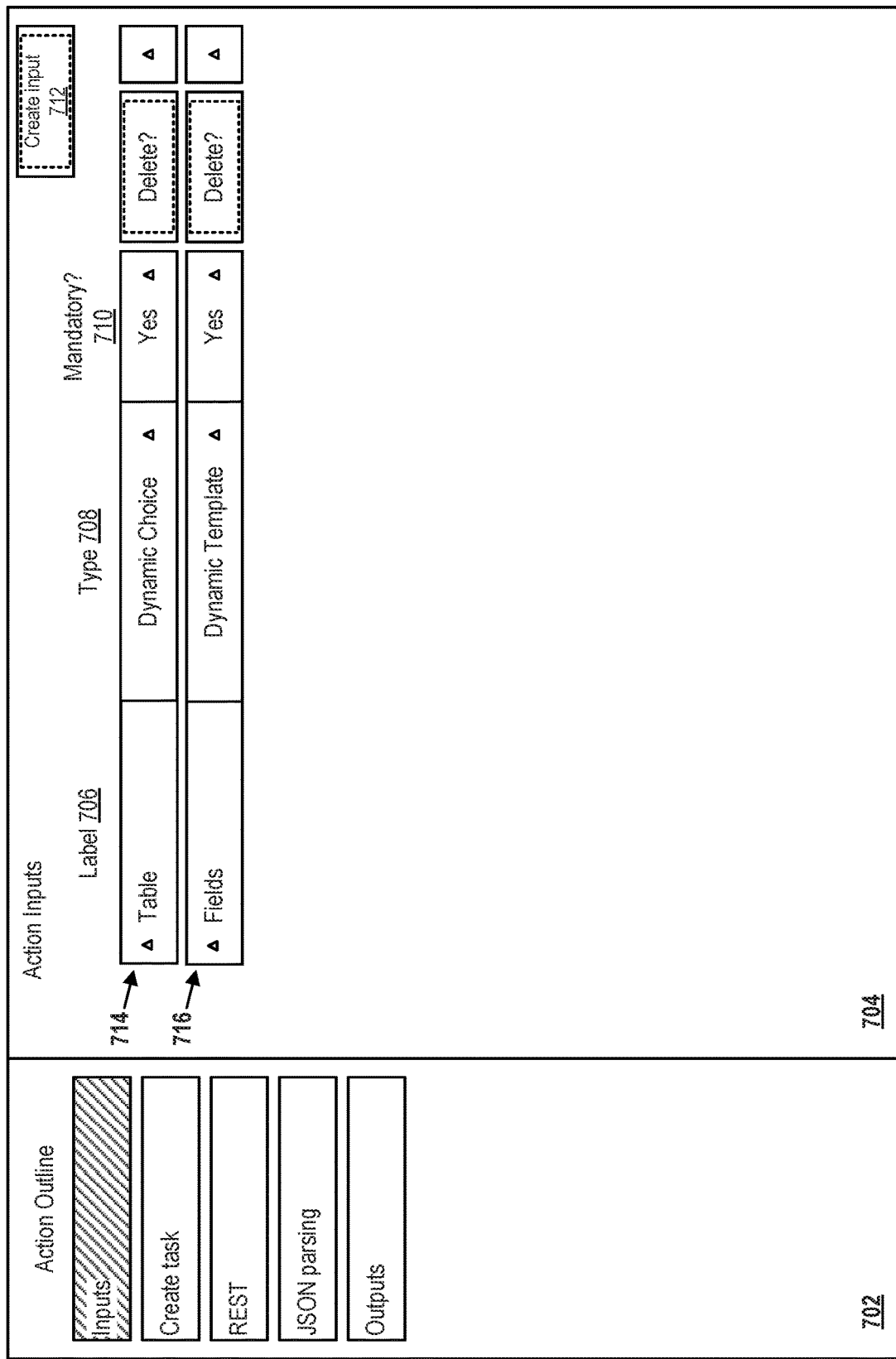
FIGS. 7A, 7B, 7C, 7D, 7E, and 7F depict graphical user interfaces for an action design tool with dynamic inputs, in accordance with example embodiments.

FIG. 7A depicts an example GUI 700 for an action design tool with dynamic input. Example GUI 700 includes pane 702 providing an action outline, and pane 704 that allows a user to define action inputs. While GUI 700 includes just two panes arranged horizontally, more or fewer panes may be displayed in various arrangements.

Pane 702 includes the steps of action definition for an action that involves transmitting a REST API call to a remote service and receiving the associated response. Accordingly, pane 702 emphasizes the current step being defined, which is shown in more detail in pane 704. To that point, pane 702 emphasizes the inputs step, as indicated by the shading. Thus, pane 704 provides options for a user to define inputs to the action (in this case dynamic inputs related to a remote service).

While not shown or discussed in detail herein, the other steps in pane 702 may involve displaying different information on pane 704 so that the action can be fully specified. The create task step may serve to create a task record in the computational instance (e.g., representing a unit of work to be carried out by a particular individual or group), potentially using some of the defined inputs. The REST step involves defining the parameters of a REST query, such as the URL of the REST API and/or headers and payload for the REST call. The JSON parsing step involves defining how any data formatted in accordance with JavaScript Object Notation (JSON) that is received from the REST call is parsed—for instance, which elements are used further and which can be ignored. The outputs step involves defining the action's output, such as what values are written to a database within the remote network management platform.

As an illustrative example, the action may involve specifying remotely-accessible tables and fields of interest in the rgb-hr.com service in the input step, defining the create task step, specifying the REST URL of the rgb-hr.com service in the REST step, defining JSON elements of interest returned by the REST call in the JSON parsing step, and mapping these JSON elements to local database tables and fields in the outputs step. Other embodiments may also be possible.

Pane 704 contains a set of columns for specifying inputs. Label column 706 indicates sources of the inputs, type column 708 indicates whether the associated input is a based on a dynamic choice (e.g., from a menu) or a dynamic template (e.g., from a list of key-value pairs), and mandatory column 710 indicates whether the presence of the associated input is required. As shown in FIG. 7A, each input may also be associated with a "delete" button that, when selected or otherwise activated, causes the input to be removed. Also, a further drop-down arrow at the far right of each input allows other associations to be made with the input.

Create input button 712, when selected or otherwise activated, causes GUI 700 to leave the input step and may automatically move on to the create task step. In other words, selecting or activating this button may cause the inputs box of pane 702 to be de-emphasized, the create task button of pane 702 to be emphasized, and pane 704 to display options for creating a task.

Figure 7B:
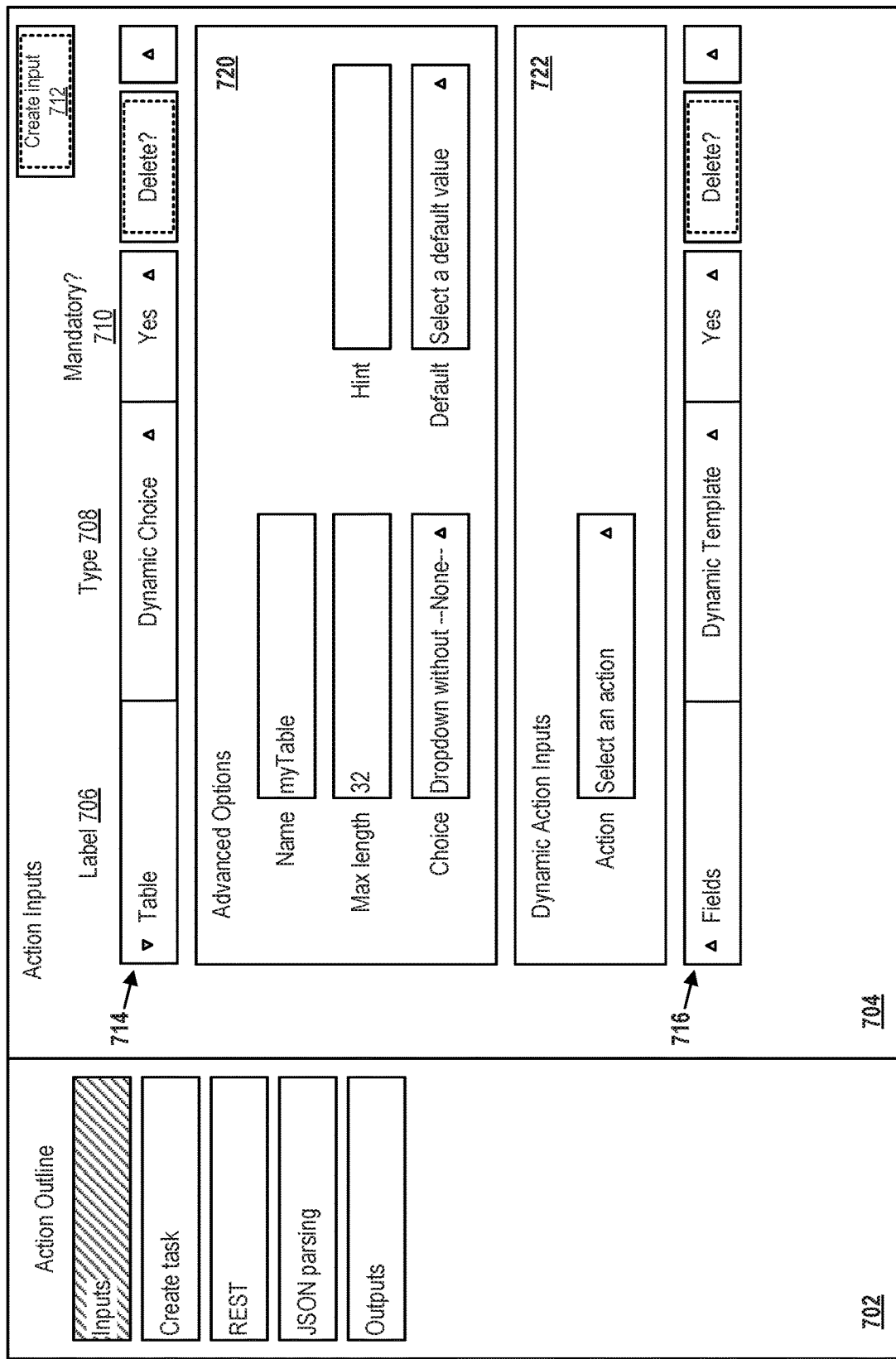

Inputs 714 and 716 can be expanded (e.g., by selecting or otherwise activating the drop-down arrows to the left of their label fields) to specify their respective sources. For example, FIG. 7B shows input 714 expanded to display advanced options 720 and dynamic action inputs 722 on pane 704.

Advanced options field 720 includes a name field, a maximum length field, a choice display field, a hint field, and a default value field. These fields define how the action being designed is going to be used with the workflow design GUI pages. The name field specifies the name of the input ("myTable"), the maximum length field specifies the maximum character length of an option in the choice field (truncating any options that are longer), the choice field defines how the input choices are selected (as shown, from a drop-down menu without a "none" option), the hint field allows an optional brief description of the input being defined, and the default field allows a default value for the input to be provided.

Dynamic action inputs 722 allow the output of another pre-defined action to be used in this input. The action field allows selection of such an action. The drop-down arrow to the right of the action field can be selected or otherwise activated to cause a drop-down menu to appear.

Figure 7C:
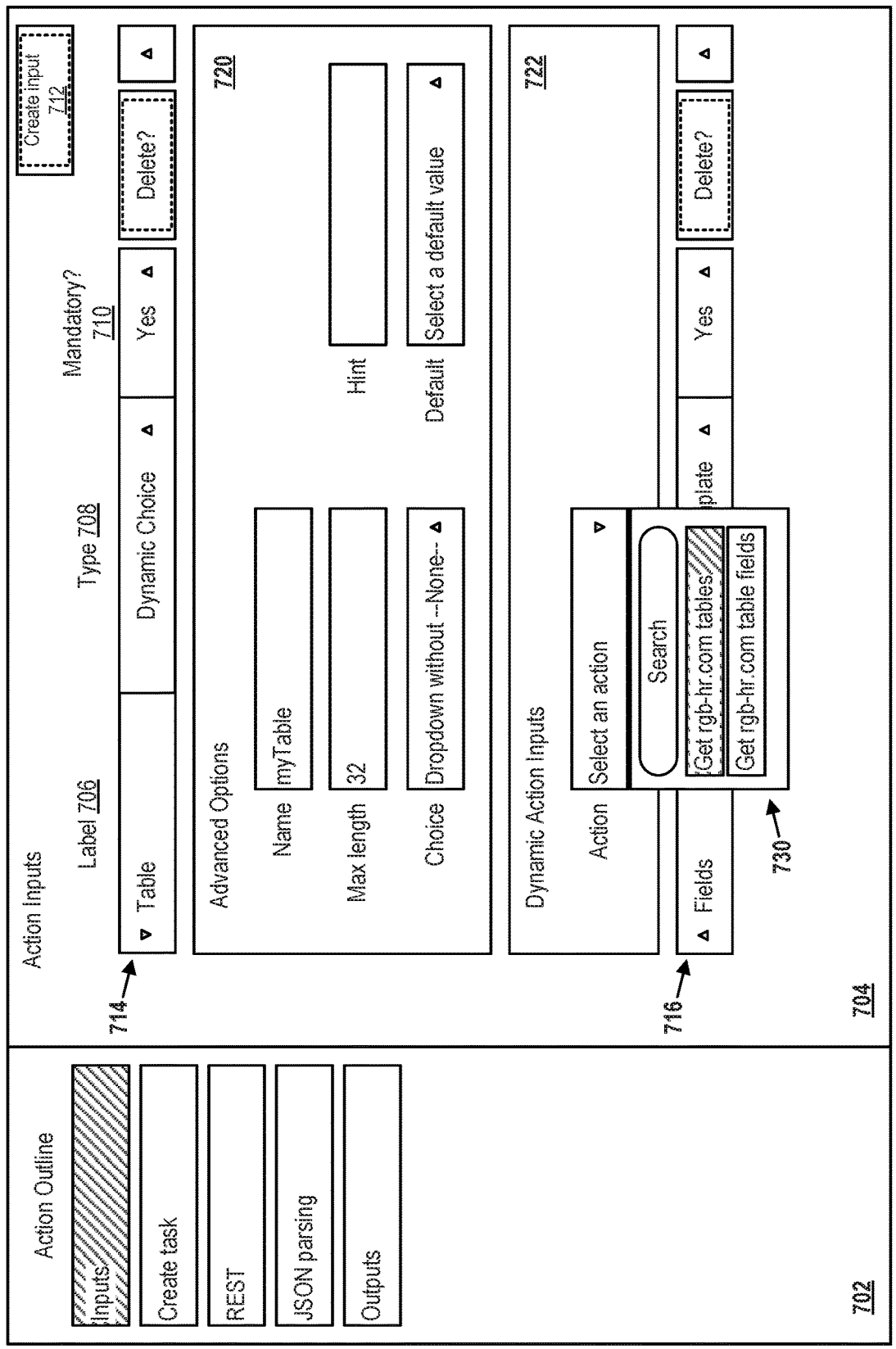

FIG. 7C shows such a drop-down menu 730. In addition to a search field in which the user can enter text, drop-down menu 730 includes options for dynamically retrieving rgb-hr.com tables or fields from rgb-hr.com tables. In further embodiments, drop-down menu 730 may include any number of pre-defined actions or sub-actions (where an action may include one or more discrete sub-actions), such as getting tables and/or fields thereof from other remote services, from a database within the user's computational instance, or from other computational instances of the remote network management platform.

Notably, the pre-defined action for getting rgb-hr.com tables may be configured to, when incorporated into a workflow, dynamically retrieve a list of tables from the rgb-hr.com service. Further, the pre-defined action for getting rgb-hr.com table fields may be configured to, when incorporated into a workflow, dynamically retrieve a list of fields within a selected one of these tables. The "myTable" variable may contain the name of the selected table.

As shown by the shading of the option for dynamically retrieving rgb-hr.com tables, this option is selected. In this way, input 714 can be configured to be a dynamically-retrieved list of tables from rgb-hr.com.

Figure 7D:
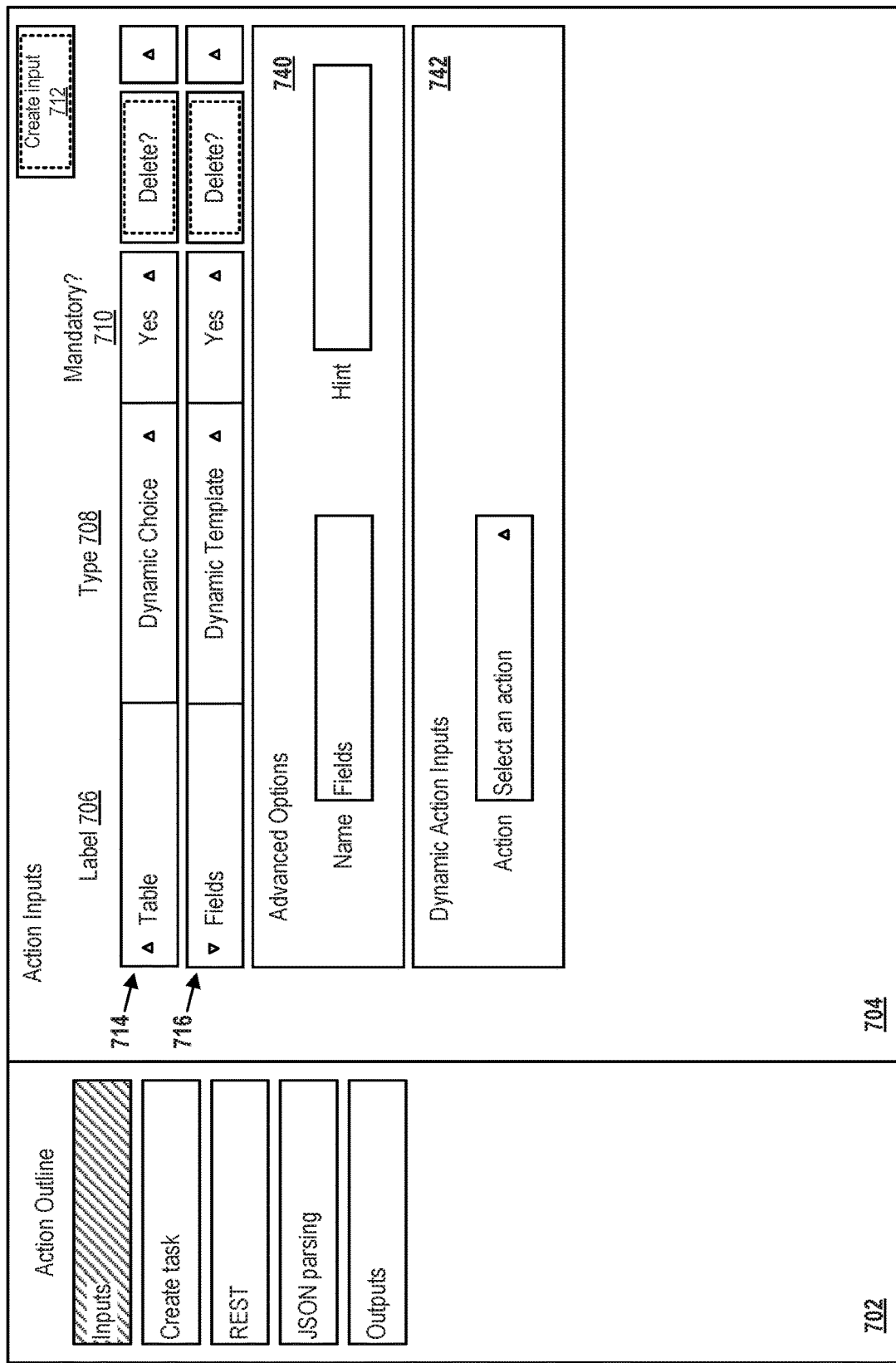

FIG. 7D continues the illustration of the action design, and depicts input 714 as collapsed (as the user had completed its definition) and input 716 as expanded. Thus, FIG. 7D shows advanced options 740 and dynamic action inputs 742 on pane 704.

Advanced options 740 include a name field and a hint field. The name field specifies the name of the input ("Fields") and the hint field allows an optional brief description of the input being defined.

Dynamic action inputs 742 allow the output of another pre-defined action to be used in this input. The action field allows selection of such an action. The drop-down arrow to the right of the action field can be selected or otherwise activated to cause a drop-down menu to appear.

Figure 7E:
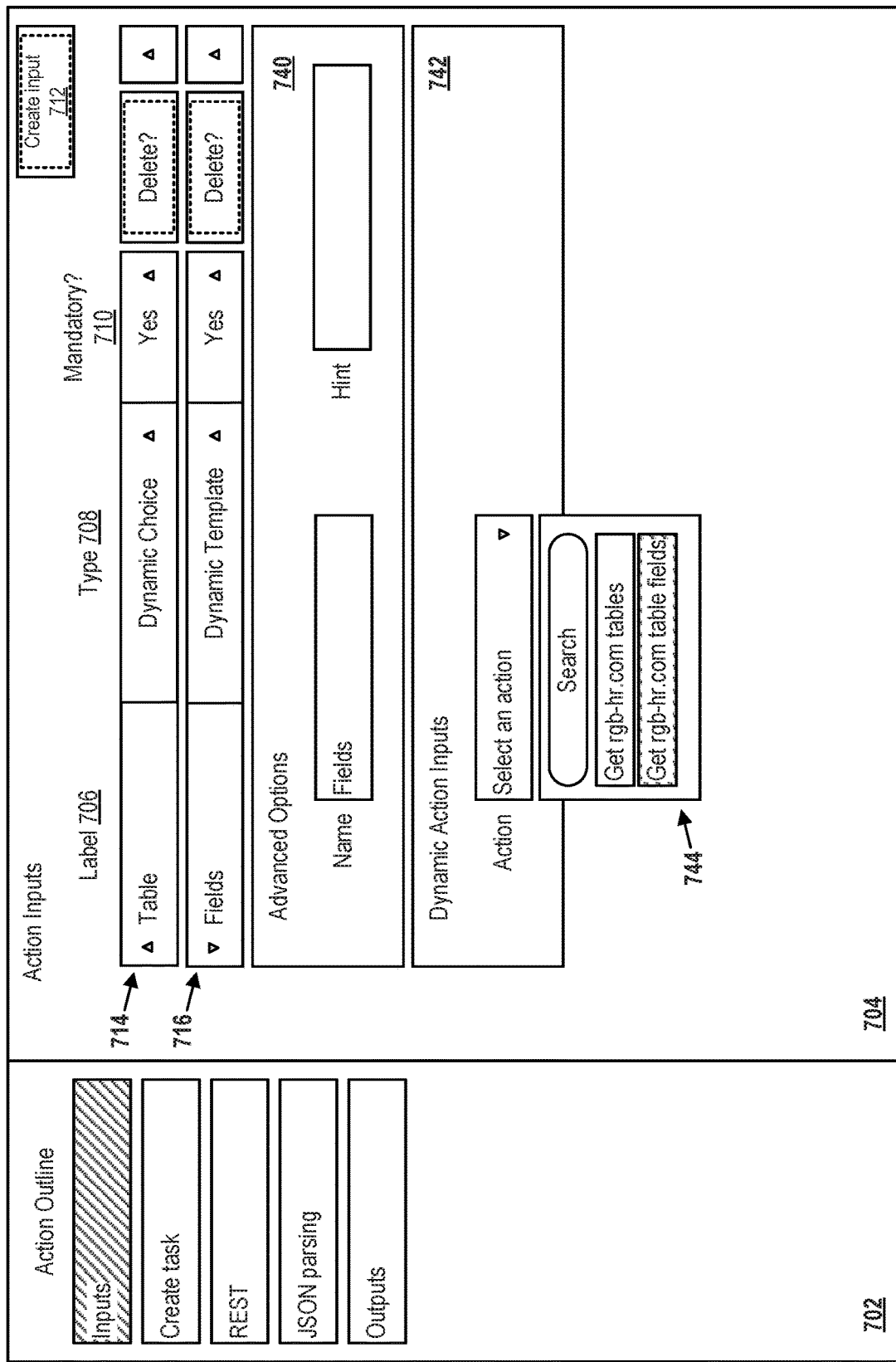

FIG. 7E shows such a drop-down menu 744. In addition to a search field in which the user can enter text, drop-down menu 744 includes options for dynamically retrieving rgb-hr.com tables or fields from rgb-hr.com tables. In further embodiments, drop-down menu may include any number of pre-defined actions or sub-actions, such as getting tables and/or fields thereof from other remote services, from a database within the user's computational instance, or from other computational instances of the remote network management platform.

As noted above, the pre-defined action for getting rgb-hr.com tables may be configured to, when executed in a workflow, dynamically retrieve a list of tables from the rgb-hr.com service. Also, the pre-defined action for getting rgb-hr.com table fields may be configured to, when executed in a workflow, dynamically retrieve a list of fields within a specific one of these tables.

As shown by the shading of the option for dynamically retrieving fields from rgb-hr.com tables, this option is selected. In this way, input 716 can be configured to be a dynamically-retrieved list of fields that appear in a specific table from rgb-hr.com.

Figure 7F:
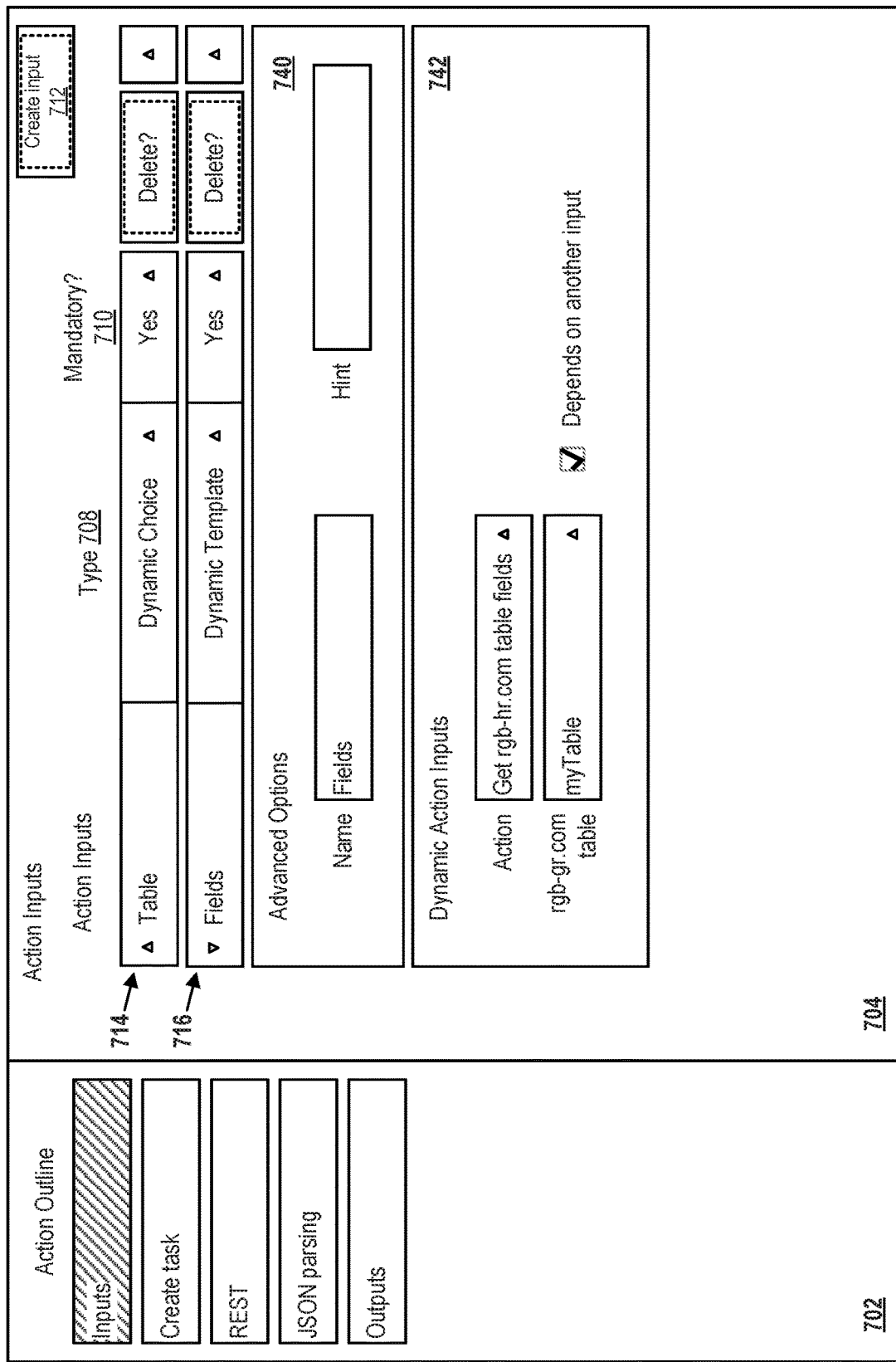

To that point, FIG. 7F continues the illustration of the action design, with the action specified as retrieving a list of fields from the table referenced by the "myTable" variable. In other words, the possible values of input 716 are determined dynamically based on the table selected during the workflow design phase. Notably, the user has checked the box titled "Depends on another input" to link input 716 to input 714.

Using GUI 700 as depicted in FIGS. 7A-7F, a user can define an action that allows dynamic selection of a table and/or fields of that table in a workflow. But these embodiments of an action design tool can also be used in other ways to specify non-table-based dynamic inputs as well, such as dynamic input from a web site, web component, file, etc. Further, the content and arrangement of GUI 700 are presented for purposes of example, and other content and arrangements may be possible.

Once the user completes the dynamic input definition process described above and shown in FIGS. 7A-7F, the user can define the remainder of the action using the steps shown in pane 702. Thus, the user may define the REST API call, how any JSON-formatted information that is returned from the call is parsed, and which of this information (or other information) should be provided as outputs of this action.

VII. Integration of an Action with Dynamic Input into a Workflow

Dynamic actions can be integrated into workflows in a similar fashion as non-dynamic (static) actions. This integration process is shown in FIGS. 8A-8F using the employee offboarding example.

Figure 8A:
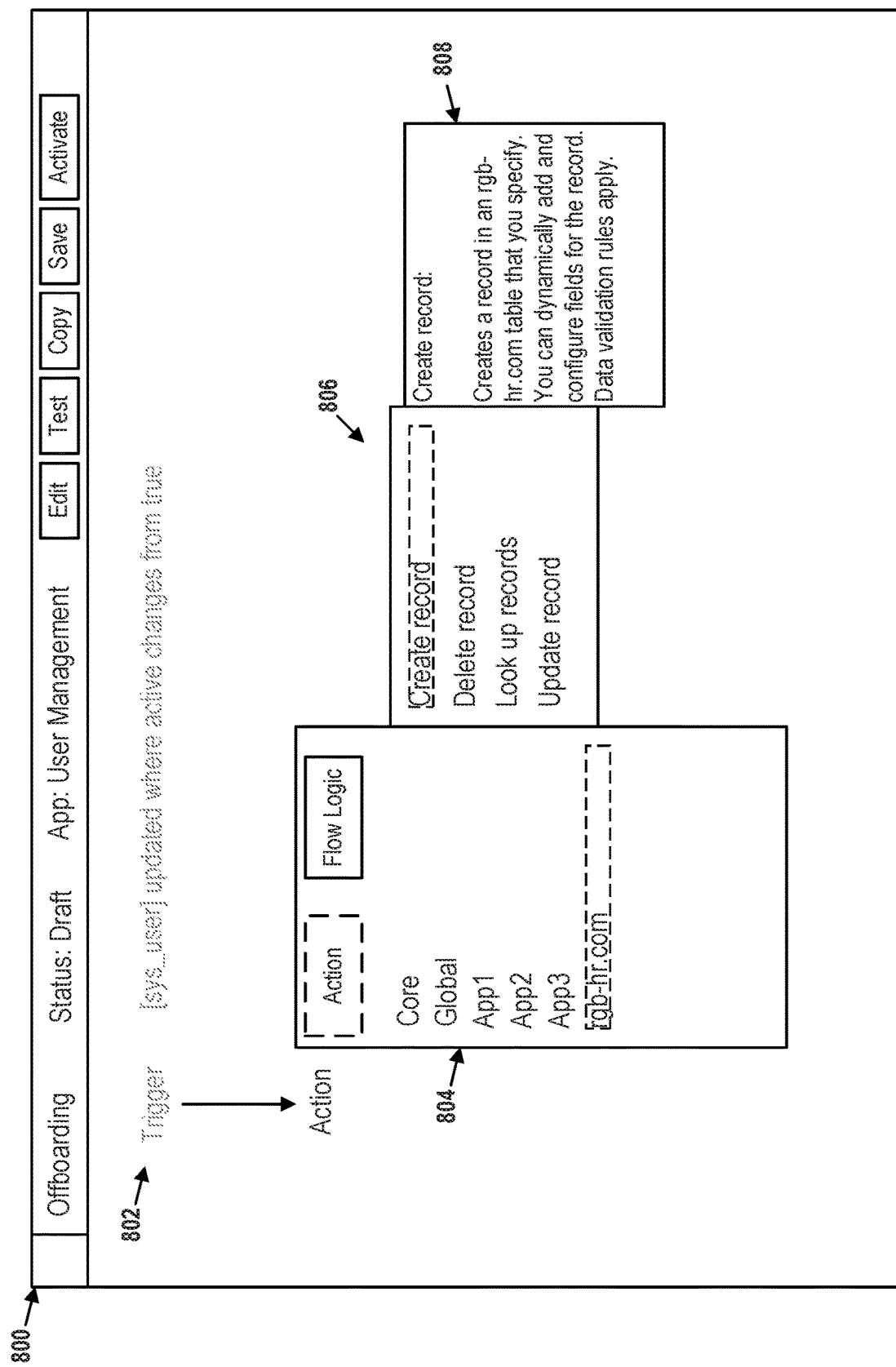
FIGS. 8A, 8B, 8C, 8D, 8E, and 8F depict graphical user interfaces for integrating an action with dynamic inputs into a workflow, in accordance with example embodiments.

In particular, GUI 800 of FIG. 8A is similar to that of GUI 632 of FIG. 6D. In FIG. 8A, a trigger has been defined as shown at 802. This trigger indicates that the workflow is to be performed once when any entry in the sys_user table (of the user's computational instance) is updated from active to another state (e.g., "false" or "inactive"). In response, an action is performed. Unlike the action specified in FIGS. 6D-6I, this action has dynamic input.

As shown in menu 804, the user has the option of specifying an action or flow logic. The dashed line around the "Action" button indicates that an action is being specified. Particularly, menu 804 displays several contexts for this action. The user has selected the "rgb-hr.com" option, which is an integration-based option that allows the workflow to access data from and write data to the rgb-hr.com service. Based on this selection, sub-menu 806 is displayed. This sub-menu provides the user the ability to select from a number of specific actions, such as "Create record", "Delete record", "Look up records", and "Update record". From these, the user has selected "Create record". Accordingly, information box 808, that describes the selected option, may be displayed. Notably, the "Create record" action is (or relates to) the dynamic action designed as shown in FIGS. 7A-7F.

Figure 8B:
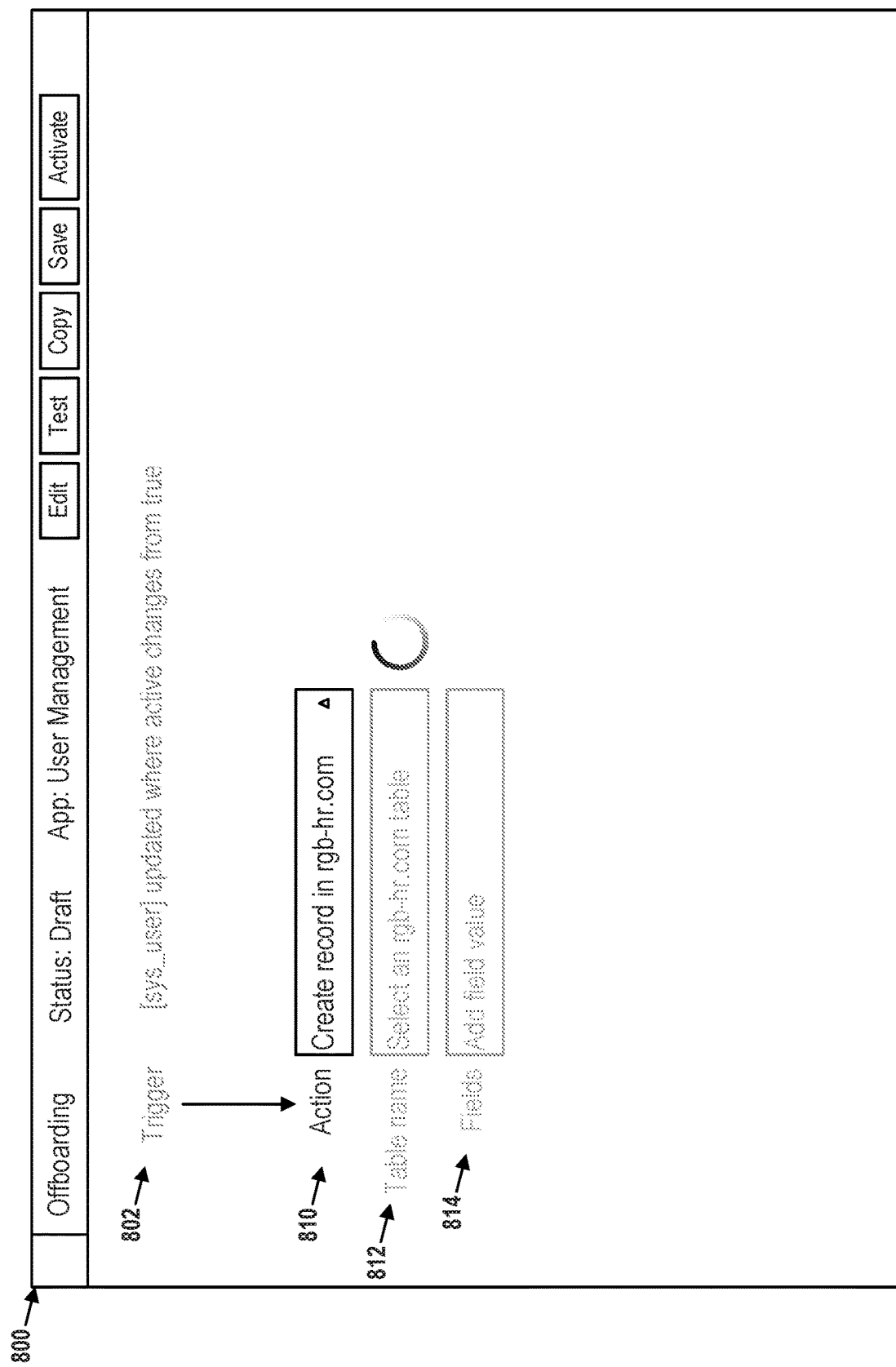

FIG. 8B depicts GUI 800 after the "Create record" action has been selected. Since this action is dynamic and involves obtaining a list of tables from the rgb-hr.com service (as defined in FIGS. 7B and 7C), the list is dynamically populated during workflow design. In particular, the dynamic population of the list is caused by the input 714 being defined as a dynamic choice that obtains the list of tables from the rgb-hr.com service.

Thus, FIG. 8B shows that the "Create record in rgb-hr.com" action 810 has been selected, and that table name 812 and fields 814 remain undetermined. In particular, the progress spinner to the right of the selector for table name 812 indicates that the rgb-hr.com service is being dynamically queried for a list of table names. Accordingly, table name 812 is grayed out until this query completes, and fields 814 is grayed out because a field cannot be specified until a table is selected.

Notably, without the support for dynamic input in this action, only a pre-determined (e.g., hard-coded) list of tables could be accessed in the workflow being defined. The dynamic input of the action defined in accordance with FIGS. 7A-7F allows any table available by way of the rgb-hr.com service to be accessed and used by the workflow.

Figure 8C:
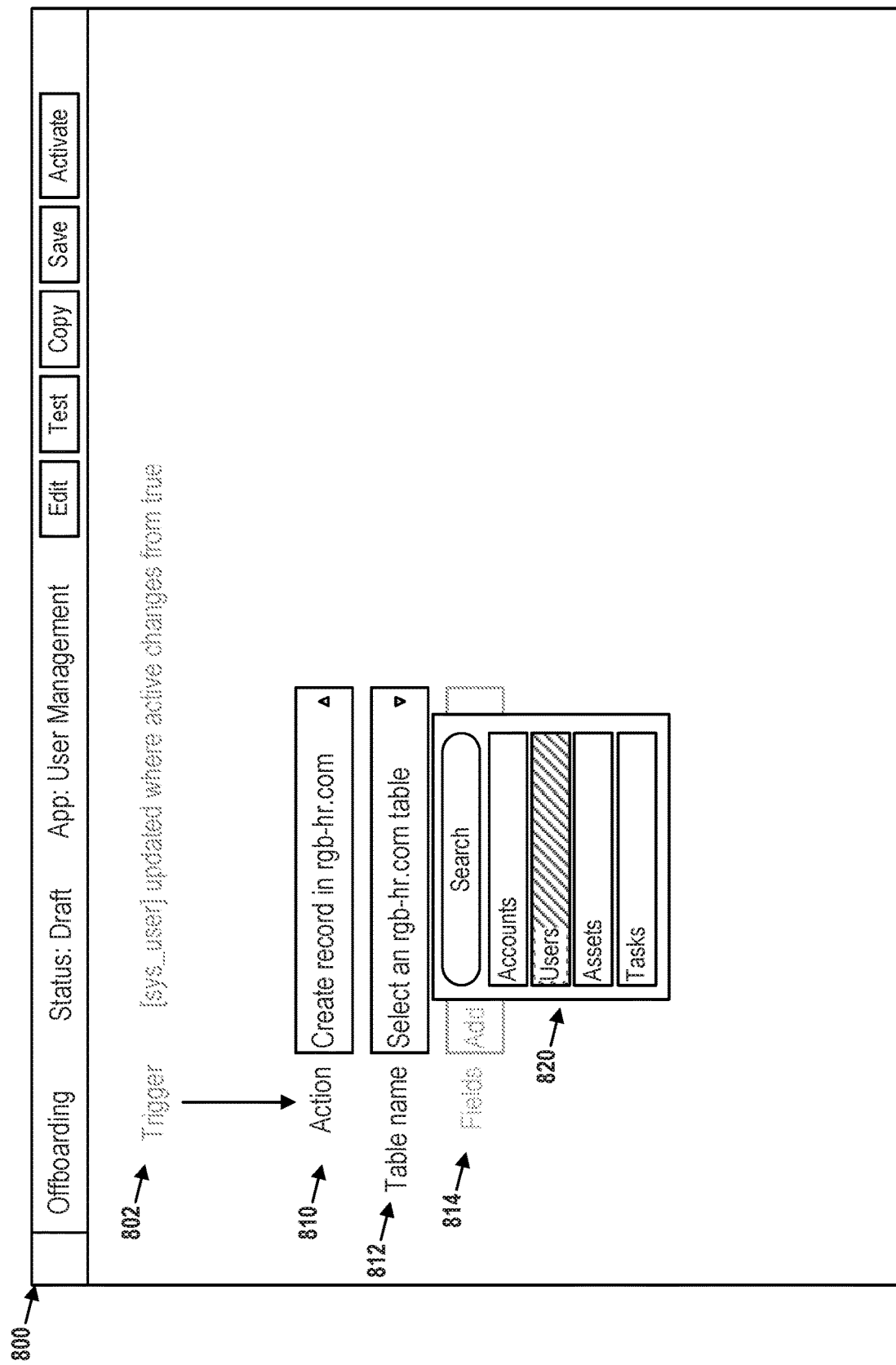

FIG. 8C depicts GUI 800 after the query has completed. Thus, table name 812 may be selected or otherwise activated to display drop-down menu 820. In addition to a search field in which the user can enter text, drop-down menu 820 includes selectors for tables of the rgb-hr.com service that were dynamically obtained from the aforementioned query. Accordingly, in this example, drop-down menu 820 displays entries for the "Accounts", "Users", "Assets", and "Tasks" tables. In various embodiments, more or fewer tables may be available by way of the rgb-hr.com service and therefore may be displayed in drop-down menu 820.

Figure 8D:
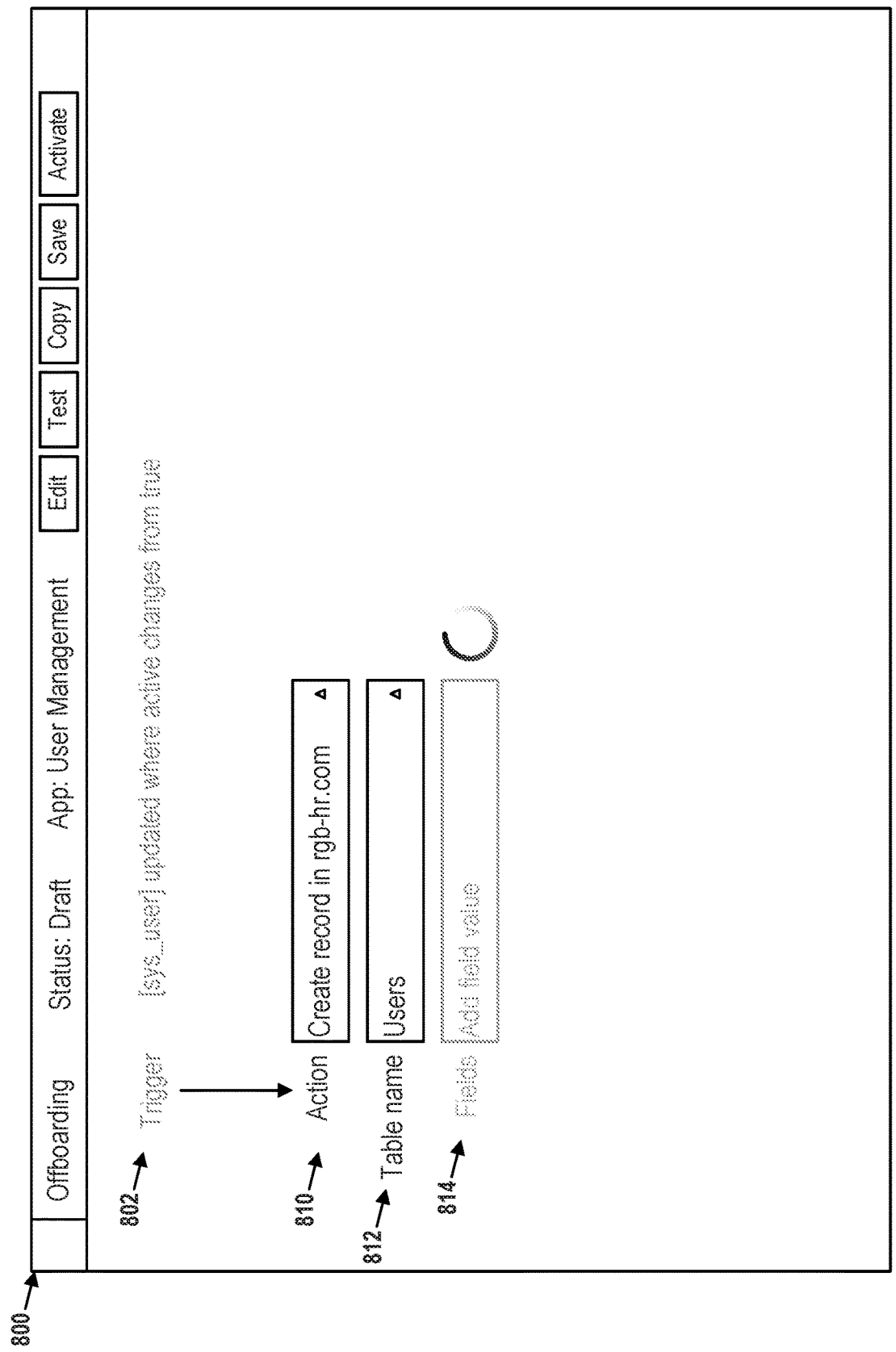

FIG. 8C depicts the "Users" table being selected. Thus, FIG. 8D depicts GUI 800 after this selection has been made—in particular, with table name 812 showing the "Users" table as selected. Since the "Create record in rgb-hr.com" action 810 involves dynamic input and fields 814 relates to input 716, a list of fields of the table "Users" is dynamically obtained. In particular, the progress spinner to the right of the selector for fields 814 indicates that the rgb-hr.com service is being dynamically queried for the list of fields. Accordingly, fields 814 is grayed out.

Without the support for dynamic input in this action, only a pre-determined (e.g., hard-coded) list of fields for a supported table could be accessed in the workflow being defined. The dynamic input of the action defined in accordance with FIGS. 7A-7F allows any field of any table available by way of the rgb-hr.com service to be accessed and used by the workflow.

Figure 8E:
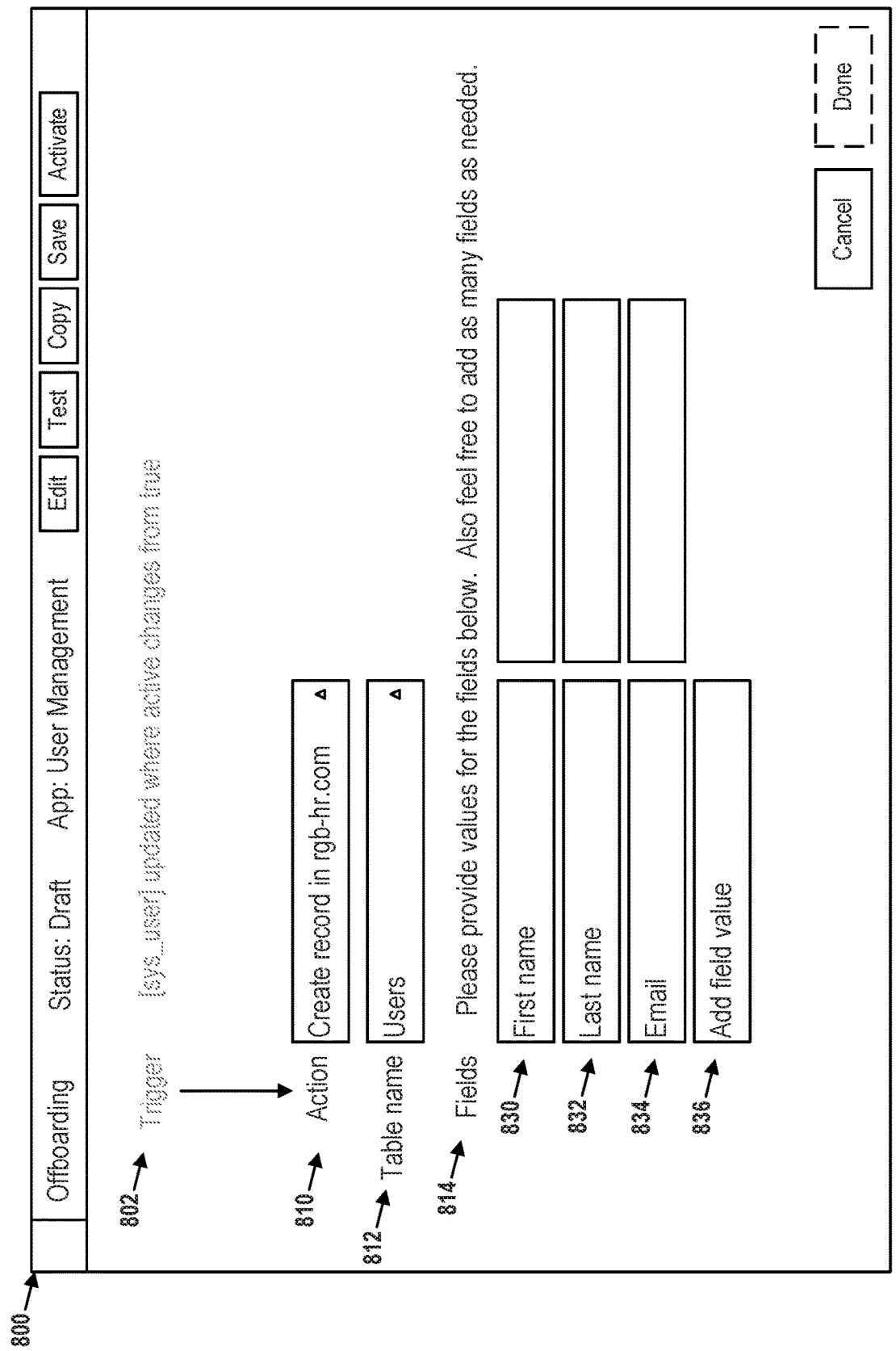

FIG. 8E depicts GUI 800 after the query has completed. Thus, a list of fields from the "Users" table is shown. Notably, fields 830, 832, and 834 may be mandatory fields that must be populated in order for a record to be created. The user may manually enter values in the text boxes to the right of these fields, or may select values from the trigger or a previous action of the workflow (not shown). Add field value option 836 is expandable to allow the user to select additional fields for display and data entry. If the user is finished integrating the action at this point, he or she may select or otherwise activate the "Done" button at the bottom right of GUI 800.

Figure 8F:
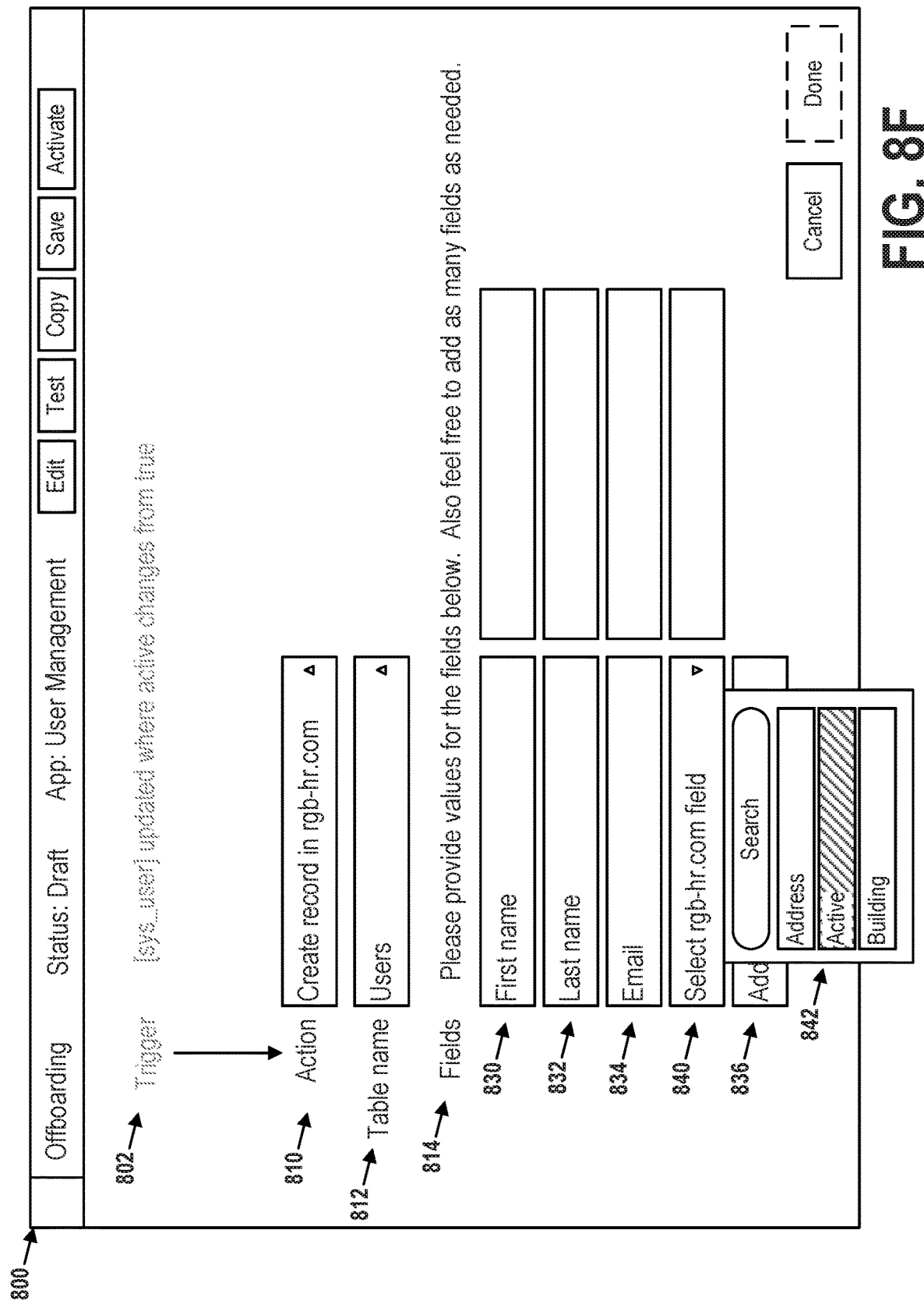

FIG. 8F shows, in GUI 800, that add field value option 836 has been selected or otherwise activated. New field 840 has been added to the display. When selected or otherwise activated, new field 840 displays drop-down menu 842. In addition to a search field in which the user can enter text, drop-down menu 842 includes selectors for fields of the "Users" table that were dynamically obtained from the aforementioned query. Accordingly, in this example, drop-down menu 842 displays entries for the "Address", "Active", and "Building" fields. In various embodiments, more or fewer fields may be available by way of the rgb-hr.com service for this table and therefore may be displayed in drop-down menu 842.

FIG. 8F shows that the user has selected the "Active" field. Though not explicitly shown in FIG. 8F, doing so may set new field 840 as the "Active" field, and thus the user can enter data in its associated text box (or by way of some other mechanism). For instance, in the employee offboarding example, the value of this field may be set to "false" or "inactive". If the user is finished integrating the action at this point, he or she may select or otherwise activate the "Done" button at the bottom right of GUI 800.

Thus, an action with dynamic inputs can be integrated into a workflow. During the integration phase, the specified remote (or local) service is queried to determine the properties thereof (e.g., tables and fields). In this manner, these properties can to be used by the workflow without the user having write code to explicitly support interfacing with each property. Further, as these properties change over time (e.g., new tables and/or fields are added to the rgb-hr.com service), no code needs to be written to support them, and new actions can be defined in a user-friendly fashion to access the changed properties. Thus, the embodiments herein support defining actions with dynamic input entirely by way of a GUI.

VIII. Action Design, Workflow Design, and Workflow Execution Phases

FIG. 9 is a depiction of characteristics of the action design, workflow design, and workflow execution phases as described herein. In various embodiments, these phases may contain more or fewer characteristics.

Action design phase 900 is depicted in FIGS. 7A-7F. In it, the user specifies one or more dynamic inputs and a remote service API that provides the data that is to be used as dynamic input. The user can also specify parsing and storage rules for this data, so that the dynamic input can be written, for example, to fields of a database table in the user's computational instance. The designed action is then stored (e.g., also in the database of the user's computational instance) for later incorporation into one or more workflows.

Workflow design phase 902 is depicted in FIGS. 8A-8F. In it, the user specifies a trigger and a flow. The flow may include the designed action. If so, the options for the dynamic inputs (as defined in the action design phase) are dynamically retrieved by way of the remote service API. The user may specify further flows, subflows, and actions, and then store the designed workflow (e.g., also in the database of the user's computational instance).

Workflow execution phase 904 is depicted in FIGS. 6A-6K and may be automatically carried out (e.g., by the user's computational instance). Once it is determined that the trigger has fired, the workflow is executed. This includes execution of the designed action with input as specified in the workflow design phase. Any other flows, subflows, and actions that are part of the workflow may also be executed.

IX. Example Operations

Figure 10:
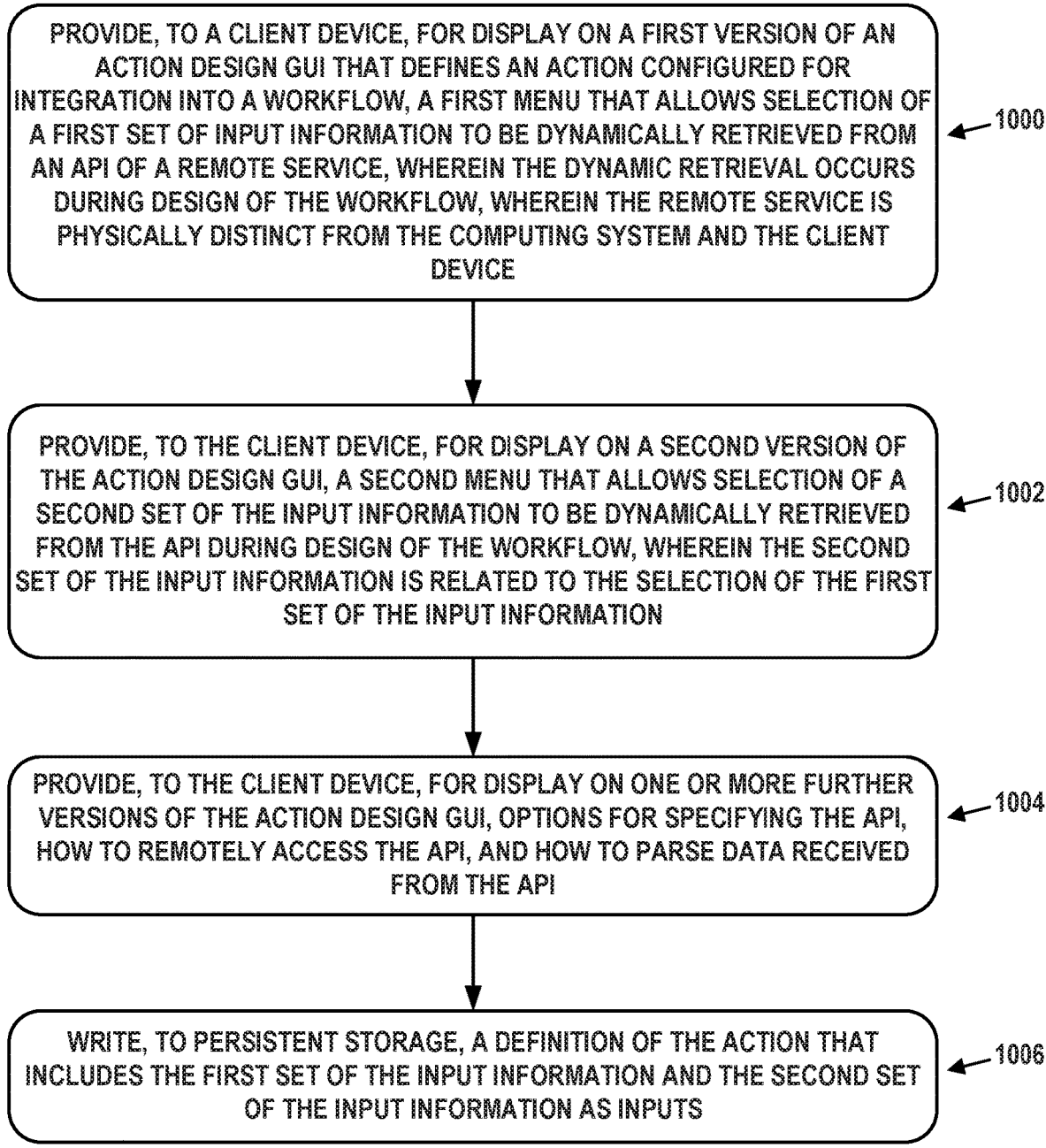
FIG. 10 is a flow chart, in accordance with example embodiments.

FIG. 10 is a flow chart illustrating an example embodiment. The process illustrated by FIG. 10 may be carried out by a computing device, such as computing device 100, and/or a cluster of computing devices, such as server cluster 200. However, the process can be carried out by other types of devices or device subsystems. For example, the process could be carried out by a portable computer, such as a laptop or a tablet device.

The embodiments of FIG. 10 may be simplified by the removal of any one or more of the features shown therein. Further, these embodiments may be combined with features, aspects, and/or implementations of any of the previous figures or otherwise described herein.

Block 1000 may involve providing, by a server device and to a client device, for display on a first version of an action design GUI that defines an action configured for integration into a workflow, a first menu that allows selection of a first set of input information to be dynamically retrieved from an API of a remote service. The dynamic retrieval occurs during design of the workflow, and the remote service is physically distinct from the server device and the client device.

Block 1002 may involve, possibly in response to receiving the selection of the first set of the input information, providing, by the server device and to the client device, for display on a second version of the action design GUI, a second menu that allows selection of a second set of the input information to be dynamically retrieved from the API during design of the workflow. The second set of the input information may be related to the selection of the first set of the input information.

Block 1004 may involve, possibly in response to receiving the selection of the second set of the input information, providing, by the server device and to the client device, for display on one or more further versions of the action design GUI, options for specifying the API, how to remotely access the API, and how to parse data received from the API.

Block 1006 may involve writing, by the server device and to persistent storage, a definition of the action that includes the first set of the input information and the second set of the input information as inputs.

In some embodiments, the first set of the input information to be dynamically retrieved from the API during design of the workflow is a list of tables provided by the remote service.

In some embodiments, the first version of the action design GUI also includes selectors for how the list of tables is to be displayed during design of the workflow, the selectors allowing specification of a drop-down menu and a default value for the list of tables.

In some embodiments, the second set of the input information to be dynamically retrieved from the API during design of the workflow is a list of fields in a table from the list of tables.

Some embodiments may further involve: (i) providing, for display on a first version of a workflow design GUI, a third menu that allows selection of the action from a list of pre-defined actions that can be incorporated into the workflow, (ii) possibly in response to receiving the selection of the action, dynamically retrieving, by way of the API, the list of tables, (iii) based on the definition of the action, providing, for display on a second version of the workflow design GUI, a fourth menu that allows selection of the table from the list of tables, (iv) based on the definition of the action and in response to receiving the selection of the table from the list of tables, dynamically retrieving, by way of the API, the list of fields in the table, (v) based on the definition of the action, providing, for display on a third version of the workflow design GUI, a fifth menu that allows procedures to be performed on a field from the list of fields; and (vi) writing, to the persistent storage, a definition of the workflow that includes the table and a value of the field after the procedures were performed.

In some embodiments, the procedures performed on the field include specifying or changing the value of the field.

In some embodiments, the third version of the workflow design GUI allows selection of the field from the list of fields.

In some embodiments, the third version of the workflow design GUI includes one or more fields from the list of fields that have been pre-defined to be required.

In some embodiments, the first menu allows specification that: (i) a previously-defined action or sub-action dynamically retrieves the list of tables from the API, and (ii) selection of the table from the list of tables occurs by way of a drop-down menu dynamically populated with the list of tables.

In some embodiments, the second menu allows specification that: (i) the list of fields relates to the table, and (ii) at least part of the list of fields is to be displayed in the fifth menu as a set of key value pairs, one key value pair per field.

X. Conclusion

The present disclosure is not to be limited in terms of the particular embodiments described in this application, which are intended as illustrations of various aspects. Many modifications and variations can be made without departing from its scope, as will be apparent to those skilled in the art. Functionally equivalent methods and apparatuses within the scope of the disclosure, in addition to those described herein, will be apparent to those skilled in the art from the foregoing descriptions. Such modifications and variations are intended to fall within the scope of the appended claims.

The above detailed description describes various features and operations of the disclosed systems, devices, and methods with reference to the accompanying figures. The example embodiments described herein and in the figures are not meant to be limiting. Other embodiments can be utilized, and other changes can be made, without departing from the scope of the subject matter presented herein. It will be readily understood that the aspects of the present disclosure, as generally described herein, and illustrated in the figures, can be arranged, substituted, combined, separated, and designed in a wide variety of different configurations.

With respect to any or all of the message flow diagrams, scenarios, and flow charts in the figures and as discussed herein, each step, block, and/or communication can represent a processing of information and/or a transmission of information in accordance with example embodiments. Alternative embodiments are included within the scope of these example embodiments. In these alternative embodiments, for example, operations described as steps, blocks, transmissions, communications, requests, responses, and/or messages can be executed out of order from that shown or discussed, including substantially concurrently or in reverse order, depending on the functionality involved. Further, more or fewer blocks and/or operations can be used with any of the message flow diagrams, scenarios, and flow charts discussed herein, and these message flow diagrams, scenarios, and flow charts can be combined with one another, in part or in whole.

A step or block that represents a processing of information can correspond to circuitry that can be configured to perform the specific logical functions of a herein-described method or technique. Alternatively or additionally, a step or block that represents a processing of information can correspond to a module, a segment, or a portion of program code (including related data). The program code can include one or more instructions executable by a processor for implementing specific logical operations or actions in the method or technique. The program code and/or related data can be stored on any type of computer readable medium such as a storage device including RAM, a disk drive, a solid state drive, or another storage medium.

The computer readable medium can also include non-transitory computer readable media such as computer readable media that store data for short periods of time like register memory and processor cache. The computer readable media can further include non-transitory computer readable media that store program code and/or data for longer periods of time. Thus, the computer readable media may include secondary or persistent long term storage, like ROM, optical or magnetic disks, solid state drives, compact-disc read only memory (CD-ROM), for example. The computer readable media can also be any other volatile or non-volatile storage systems. A computer readable medium can be considered a computer readable storage medium, for example, or a tangible storage device.

Moreover, a step or block that represents one or more information transmissions can correspond to information transmissions between software and/or hardware modules in the same physical device. However, other information transmissions can be between software modules and/or hardware modules in different physical devices.

The particular arrangements shown in the figures should not be viewed as limiting. It should be understood that other embodiments can include more or less of each element shown in a given figure. Further, some of the illustrated elements can be combined or omitted. Yet further, an example embodiment can include elements that are not illustrated in the figures.

While various aspects and embodiments have been disclosed herein, other aspects and embodiments will be apparent to those skilled in the art. The various aspects and embodiments disclosed herein are for purpose of illustration and are not intended to be limiting, with the true scope being indicated by the following claims.

What is claimed is:

1. A method comprising:
providing, via a server device, an action design graphical user interface (GUI) for display on a client device;
providing, via the server device, for display on the client device, a first menu of the action design GUI, wherein the first menu of the action design GUI comprises a first set of first input information selectable via the action design GUI;
receiving a first selection of the first set of first input information via the action design GUI, wherein the first selection of the first set of first input information indicates that the first set of first input information is to be dynamically retrieved from an application programming interface (API) of a remote service during design of a workflow;
providing, via the server device, for display on the client device, in response to receiving the first selection of the first set of first input information, a second menu of the action design GUI, wherein the second menu of the action design GUI comprises a second set of second input information selectable via the action design GUI, and wherein the second set of second input information is based on to the first selection of the first set of first input information;
receiving a second selection of the second set of second input information via the action design GUI, wherein the second selection of the second set of second input information indicates that the second set of second input information is to be dynamically retrieved from the API of the remote service during design of the workflow; and
storing, via the server device, a defined action for integration into the workflow, wherein the defined action comprises the first set of first input information and the second set of second input information as inputs.

2. The method of claim 1, wherein the action design GUI comprises an action outline including a plurality of steps indicative of processes for defining the defined action.

3. The method of claim 2, wherein the plurality of steps comprises: an input step, a create task step, a representational state transfer (REST) step, a parsing step, an output step, or a combination thereof, and wherein the input step is associated with presenting the first menu of the action design GUI, receiving the first selection of the first set of first input information, presenting the second menu of the action design GUI, receiving the second selection of the second set of second input information, or a combination thereof.

4. The method of claim 1, comprising:
providing, via the server device, a workflow design GUI for display on the client device; and
providing, for display on the client device, a third menu of the workflow design GUI, wherein the third menu of the workflow design GUI comprises a plurality of actions selectable via the workflow design GUI, wherein each action of the plurality of actions is to be incorporated into the workflow upon selection of an action of the plurality of actions, and wherein the plurality of actions comprises the defined action.

5. The method of claim 4, comprising:
receiving, via the workflow design GUI, a third selection of the defined action;
dynamically retrieving the first set of first input information from the API of the remote service in response to receiving the third selection of the defined action;
providing, for display on the client device, a fourth menu of the workflow design GUI in response to receiving the third selection of the defined action, wherein the fourth menu of the workflow design GUI comprises the first set of first input information, and each first input information of the first set of first input information is selectable via the workflow design GUI; and
receiving a fourth selection of a selected first input information of the first set of first input information via the workflow design GUI.

6. The method of claim 5, comprising:
dynamically retrieving the second set of second input information from the API of the remote service in response to receiving the fourth selection of the selected first input information, wherein the second set of second input information is associated with the selected first input information of the first set of first input information;
providing, for display on the client device, a fifth menu of the workflow design GUI in response to receiving the fourth selection of the selected first input information of the first set of first input information, wherein the fifth menu of the workflow design GUI comprises the second set of second input information, and each second input information of the second set of second input information is selectable via the workflow design GUI; and
receiving a fifth selection of a selected second input information of the second set of second input information via the workflow design GUI.

7. The method of claim 6, wherein the fifth menu of the workflow design GUI comprises one or more procedures to be performed on the selected second input information of the second set of second input information, and wherein the method comprises storing a defined workflow comprising the selected first input information of the first set of first input information and a value of the selected second input information of the second set of second input information after performance of the one or more procedures.

8. A system, comprising:
a processor; and
a persistent storage, accessible by the processor, the persistent storage storing:
a definition of an application programming interface (API) of a remote service, wherein the API of the remote service provides access to input information stored at the remote service; and
instructions that, when executed by the processor, cause the processor to perform actions comprising:
presenting a first menu on an action design graphical user interface (GUI) of a client device, wherein the first menu on the action design GUI comprises a first set of first input information selectable via the action design GUI, and wherein a first selection of the first set of first input information indicates that the first set of first input information is to be dynamically retrieved from an application programming interface (API) of a remote service during design of a workflow upon selection of the first set of first input information;
presenting a second menu on the action design GUI in response to receipt of the first selection of the first set of first input information, wherein the second menu on the action design GUI comprises a second set of second input information selectable via the action design GUI, wherein the second set of second input information is based on the first selection of the first set of first input information, and wherein a second selection of the second set of second input information indicates that the second set of second input information is to be dynamically retrieved from the API of the remote service during design of the workflow upon selection of the second set of second input information; and
storing a defined action in the persistent storage, wherein the defined action is configured for integration into the workflow, and wherein the defined action comprises the first set of first input information and the second set of second input information as inputs.

9. The system of claim 8, wherein the first set of first input information comprises a list of tables provided by the remote service.

10. The system of claim 9, wherein the second set of second input information comprises a respective list of fields associated with each table from the list of tables provided by the remote service.

11. The system of claim 10, wherein the instructions, when executed by the processor, cause the processor to perform actions comprising:
presenting a third menu on a workflow design GUI of the client device, wherein the third menu on the workflow design GUI comprises a plurality of actions selectable via the workflow design GUI, wherein each action of the plurality of actions is incorporated into the workflow upon selection of an action of the plurality of actions, and wherein the plurality of actions comprises the defined action;
dynamically retrieving the list of tables from the API of the remote service in response to receipt of a third selection of the defined action;
presenting a fourth menu on the workflow design GUI, wherein the fourth menu on the workflow design GUI comprises the list of tables dynamically retrieved from the API of the remote service;
in response to receipt of a fourth selection of a selected table from the list of tables dynamically retrieved from the API of the remote service, dynamically retrieving the respective list of fields associated with the selected table from the list of tables dynamically retrieved from the API of the remote service;
in response to receipt of a fifth selection of a selected field from the respective list of fields associated with the selected table from the list of tables dynamically retrieved from the API of the remote service, presenting a fifth menu on the workflow design GUI comprising one or more procedures to be performed on the selected field from the respective list of fields associated with the selected table from the list of tables dynamically retrieved from the API of the remote service; and
storing a defined workflow comprising the selected table from the list of tables dynamically retrieved from the API of the remote service and a value of the selected field from the respective list of fields associated with the selected table from the list of tables dynamically retrieved from the API of the remote service after performance of the one or more procedures.

12. The system of claim 11, wherein the one or more procedures to be performed on the selected field from the respective list of fields associated with the selected table from the list of tables dynamically retrieved from the API of the remote service comprise setting the value of the selected field from the respective list of fields associated with the selected table from the list of tables dynamically retrieved from the API of the remote service.

13. The system of claim 8, wherein the first menu on the action design GUI comprises the first set of first input information dynamically populated in the first menu on the action design GUI, a pre-defined action associated with the remote service, or both.

14. The system of claim 8, wherein the second menu on the action design GUI comprises the second set of second input information dynamically populated in the second menu on the action design GUI, a pre-defined action associated with the remote service, or both.

15. A non-transitory computer-readable medium storing instructions that, when executed by one or more processors, are configured to cause the one or more processors to perform actions comprising:
displaying a first version of an action design graphical user interface (GUI) on a client device, wherein the first version of the action design GUI comprises a first menu comprising a first set of first input information selectable via the first version of the action design GUI;
receiving a first selection of the first set of first input information via the first version of the action design GUI, wherein the first selection of the first set of first input information indicates that the first set of first input information is to be dynamically retrieved from an application programming interface (API) of a remote service during design of a workflow;

displaying a second version of the action design GUI on the client device, wherein the second version of the action design GUI comprises a second menu comprising a second set of second input information selectable via the second version of the action design GUI, and wherein the second set of second input information is based on the first selection of the first set of first input information;

receiving a second selection of the second set of second input information via the second version of the action design GUI, wherein the second selection of the second set of second input information indicates that the second set of second input information is to be dynamically retrieved from the API of the remote service during design of the workflow; and storing a defined action on a persistent storage, wherein the defined action comprises the first set of first input information and the second set of second input information as inputs.

16. The non-transitory computer-readable medium of claim 15, wherein the first version of the action design GUI comprises a name field, a maximum length field, a choice display field, a hint field, a default value field, or any combination thereof, associated with the first set of first input information and indicative of a design of the defined action to be used in a workflow design GUI.

17. The non-transitory computer-readable medium of claim 15, wherein the first version of the action design GUI, the second version of the action design GUI, or both, comprises a label column, a type column, a mandatory column, or any combination thereof, indicative of information associated with input information.

18. The non-transitory computer-readable medium of claim 15, wherein the second version of the action design GUI comprises a name field, a hint field, or both, associated with the second set of second input information and indicative of a design of the defined action to be used in a workflow design GUI.

19. The non-transitory computer-readable medium of claim 15, wherein the second version of the action design GUI comprises an icon selectable to link the second version of the action design GUI with the first version of the action design GUI.

20. The non-transitory computer-readable medium of claim 15, instructions that, when executed by the one or more processors, are configured to cause the one or more processors to perform actions comprising displaying a third version of the action design GUI on the client device in response to receiving the first selection of the first set of first input information and the second selection of the second set of second input information, wherein the third version of the action design GUI is associated with specifying the API of the remote service, specifying how to remotely access the API of the remote service, specifying how to parse data received from the API of the remote service, or any combination thereof.

* * * * *